(12) United States Patent
Ishiguro et al.

(10) Patent No.: US 9,650,012 B2
(45) Date of Patent: May 16, 2017

(54) AIRBAG DEVICE FOR A DRIVER'S SEAT

(71) Applicant: TOYODA GOSEI CO., LTD., Kiyosu-shi, Aichi-ken (JP)

(72) Inventors: Naohiko Ishiguro, Kiyosu (JP); Mikine Hayashi, Kiyosu (JP); Kenichi Fukurono, Kiyosu (JP); Kenji Sasaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/060,803

(22) Filed: Mar. 4, 2016

(65) Prior Publication Data

US 2016/0288755 A1   Oct. 6, 2016

(30) Foreign Application Priority Data

Mar. 31, 2015  (JP) .................... 2015-071685

(51) Int. Cl.
  *B60R 21/2338*   (2011.01)
  *B60R 21/239*    (2006.01)
  *B60R 21/203*    (2006.01)

(52) U.S. Cl.
  CPC ........ *B60R 21/239* (2013.01); *B60R 21/2037* (2013.01); *B60R 21/2338* (2013.01); *B60R 2021/2395* (2013.01); *B60R 2021/23384* (2013.01)

(58) Field of Classification Search
  CPC .............. B60R 21/203; B60R 21/2338; B60R 2021/23382
  See application file for complete search history.

(56) References Cited

U.S. PATENT DOCUMENTS

| 9,050,942 | B2 | 6/2015 | Ishiguro et al. | |
| 2012/0068444 | A1* | 3/2012 | Suzuki | B60R 21/239 |
| | | | | 280/739 |
| 2013/0313809 | A1* | 11/2013 | Yamaji | B60R 21/203 |
| | | | | 280/729 |
| 2014/0062071 | A1 | 3/2014 | Ishiguro et al. | |
| 2015/0239422 | A1* | 8/2015 | Ishiguro | B60R 21/203 |
| | | | | 280/731 |
| 2016/0288756 | A1* | 10/2016 | Ishiguro | B60R 21/203 |

FOREIGN PATENT DOCUMENTS

| JP | 2013-203167 A | 10/2013 |
| JP | 2014-46724 A | 3/2014 |

\* cited by examiner

*Primary Examiner* — James English
(74) *Attorney, Agent, or Firm* — Posz Law Group, PLC

(57) ABSTRACT

An airbag of an airbag device for a driver's seat includes an exhaust strap which includes a cover section that closes off an outer opening of a vent hole at airbag deployment in an openable fashion and connecting bands extending from opposite sides of the cover section and joined to a driver-side wall. The exhaust strap is so configured, when the driver-side wall of the airbag cushions the driver at airbag deployment and moves toward a vehicle-side wall, that the connecting bands loosen and allow a region towards a distant edge of the cover section to loosen and pass through the outer opening such that the outer opening and an inner opening communicate to open the vent hole. The length of the distant edge of the exhaust strap is shorter than a length of a proximate edge of the exhaust strap.

5 Claims, 19 Drawing Sheets

Fig. 14 At Straight-Ahead Position
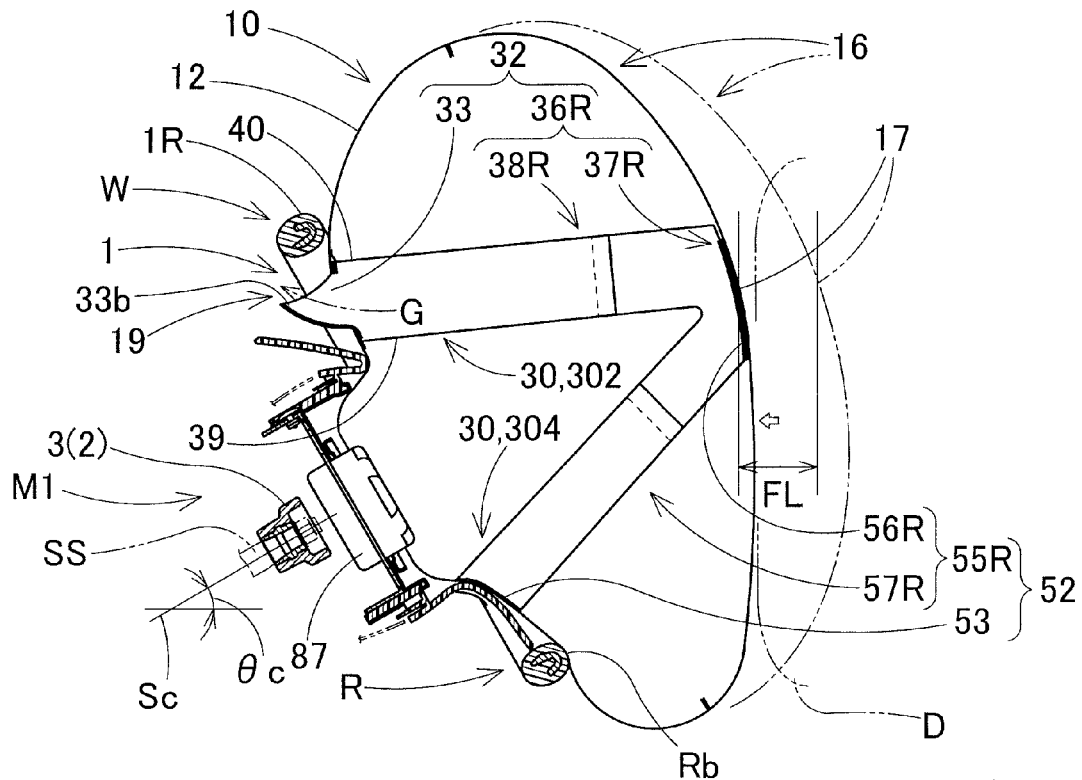
Fig. 14B At 180° Turned Position
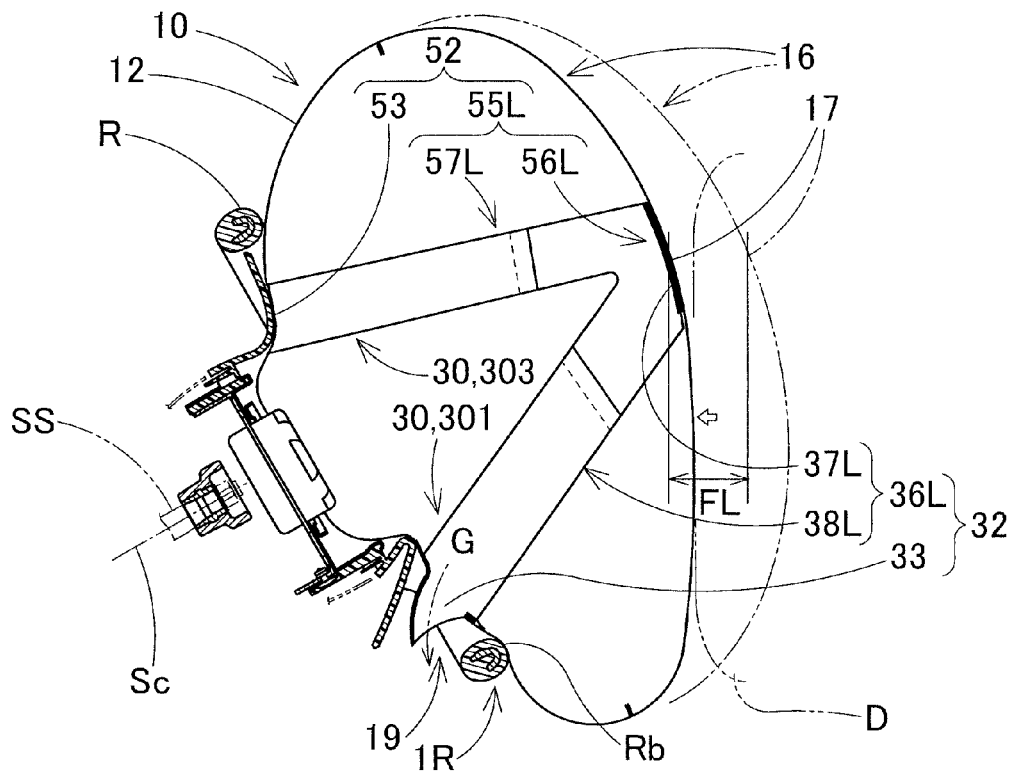

AIRBAG DEVICE FOR A DRIVER'S SEAT

CROSS REFERENCE TO RELATED APPLICATIONS

The Present application claims priority from Japanese Patent Application No. 2015-71685 of Ishiguro et al., filed on Mar. 31, 2015, the entire disclosure of which is incorporated herein by reference.

BACKGROUND OF THE INVENTION

1. Field of the Invention

The present invention relates to an airbag device for a driver's seat mountable on a steering wheel of a vehicle. In particular, the invention relates to an airbag device in which a vent hole of an airbag covered by a cover portion, which is continuous with a tether that controls a clearance between a vehicle-side wall and a driver-side wall of the airbag at deployment, is openable when the cover portion loosens along with loosening of the tether when the airbag cushions the driver.

2. Description of Related Art

JP 2014-046724 A, by way of example, discloses a known airbag device for a driver's seat including an airbag which is stored in a boss section disposed at a generally center of a rim of a steering wheel in a folded-up configuration. The airbag is inflatable in such a manner as to separate a vehicle-side wall and a driver-side wall when fed with an inflation gas. The airbag includes more than one tether which connect the vehicle-side wall and the driver-side wall for controlling a clearance between the vehicle-side wall and the driver-side wall at airbag inflation, an inlet opening disposed at the generally center of the vehicle-side wall for introducing an inflation gas and a vent hole located in a vicinity of the inlet opening on the vehicle-side wall for exhausting the inflation gas. The vent hole is composed of an outer opening formed on an outer face region of the vehicle-side wall and an inner opening formed on an inner face region of the vehicle-side wall in such a manner as to overlap with the outer opening. The inner face region is arranged on an inner side of the outer face region. One of the tethers serves as an exhaust strap. The exhaust strap includes a cover section which is held between the outer face region and inner face region for covering the outer opening and a pair of connecting bands extending from opposite sides of the cover section and connected to the driver-side wall. The outer face region and inner face region are joined together by an inner edge close to the inlet opening and an outer edge facing away from the inlet opening while holding the cover section between the outer face region and inner face region. Accordingly, the connecting bands extend from the cover section in a symmetrical fashion with respect to a straight line connecting the inlet opening and vent hole as viewed from the driver-side wall at airbag deployment. Further, the cover section is joined to the vehicle-side wall by its edge proximate the inlet opening.

If the airbag as deployed cushions the driver, the driver-side wall moves towards the vehicle-side wall and the connecting bands loosen. Then the edge of the cover section not joined to the vehicle-side wall slips out of the outer opening and is deployed out of the outer face region, which provides gas communication between the outer opening and inner opening and opens the vent hole.

In the above conventional airbag device, the exhaust strap is joined to a position on the driver-side wall slid from the vent hole along the steering shaft to which the steering wheel is mounted, not to the center of the driver-side wall. With this configuration, the loosening amount of the connecting bands of the exhaust strap as the airbag cushions the driver is likely to vary from an instance where the vehicle is driven straight ahead to an instance where the steering wheel is half turned from the straight-ahead position. That is, the steering shaft is mounted at a slant and the steering wheel is mounted on the steering shaft such that the rim forms a right angle to the steering shaft. If, in this configuration, a vent hole is disposed in a front area of the vehicle-side wall (i.e., at a distance from the driver) when the rim is at the straight-ahead position, it will be located in a rear region of the vehicle-side wall (i.e., closer to the driver) when a half turn is made. If the airbag cushions the driver when the steering wheel is at the half turned position, the loosening amount of the connecting bands of the exhaust strap will be greater than that at the straight-ahead position. That is, an amount of an inflation gas released from the vent hole may vary depending on the angular position of the steering wheel, which gives a room for improvement.

SUMMARY OF THE INVENTION

An object of the present invention is to provide an airbag device for a driver's seat that has a stable air venting property of a vent hole of an airbag.

The airbag device for a driver's seat of the invention is adapted to be mounted on a boss section of a steering wheel of a vehicle disposed at a generally center of a rim of the steering wheel, and includes an airbag stored in the boss section in a folded-up configuration and inflatable with an inflation gas. The airbag includes a vehicle-side wall deployable towards the rim of the steering wheel, a driver-side wall deployable towards the driver's seat and a plurality of tethers that connect the vehicle-side wall and driver-side wall for regulating a clearance between the vehicle-side wall and driver-side wall at airbag deployment. The vehicle-side wall includes an inlet opening disposed generally at the center of the vehicle-side wall for introducing an inflation gas, a vent hole disposed in a vicinity of the inlet opening for releasing the inflation gas, an outer face region that forms an outer shell of the vehicle-side wall at the location of the vent hole and an inner face region that is disposed on an inner side of the outer face region. The vent hole includes an outer opening formed on the outer face region and an inner opening formed on the inner face region in such a manner as to overlap with the outer opening. A pair of tethers out of the tethers serves as an exhaust strap. The exhaust strap includes: a cover section that is held between the outer face region and inner face region in such a manner as to be joined to the vehicle-side wall and closes off the outer opening at airbag deployment in an openable fashion; and a pair of connecting bands extending from opposite sides of the cover section and joined to the driver-side wall. The connecting bands extend from the cover section in a symmetrical fashion with respect to a straight line connecting the inlet opening and vent hole as viewed from a part of the driver-side wall at full inflation of the airbag. The cover section includes a proximate edge disposed on a part close to the inlet opening and a distant edge disposed on a part distant from the inlet opening, and the cover section is joined to the vehicle-side wall by the proximate edge. The exhaust strap closes off the vent hole at airbag deployment with the cover section and is so configured, when the driver-side wall cushions a driver at airbag deployment and moves toward the vehicle-side wall, that the connecting bands loosen and allow a region of the cover section towards the distant edge to loosen and pass through the outer opening such that the outer opening and inner opening communicate to open the vent hole. The outer face region and inner face region of the vehicle-side wall are joined together by inner edges thereof disposed on a part close to the inlet opening and outer edges thereof disposed on a part away from the inlet opening so as to hold the cover section of the exhaust strap between the outer face region and inner face region. The connecting bands of the exhaust strap are joined to the driver-side wall at a position closer to a center of the driver-side wall compared with a position of the vent hole and in a symmetrical fashion about a center region of the driver side wall, as viewed from the part of the driver-side wall at full deployment of the airbag. The exhaust strap includes a proximate edge disposed on a part close to the inlet opening and a distant edge disposed on a part distant from the inlet opening, and a length of the distant edge of the exhaust strap is shorter than a length of the proximate edge of the exhaust strap.

With the airbag device of the invention, when the driver-side wall cushions the driver at airbag deployment and moves toward the vehicle-side wall, the connecting bands of the exhaust strap will loosen, which will allow the distant edge region of the cover section, which has been subjected to an internal pressure of the airbag through the inner opening of the inner face region, to pass through the outer opening and be deployed out of the outer face region. This will provide gas communication between the outer opening on the outer face region and inner opening on the inner face region, thus opening the vent hole. Accordingly, the airbag will be able to release an extra inflation gas and cushion the driver with an adequate internal pressure.

The steering wheel is mounted on a steering shaft which is mounted on the vehicle at a certain angle. The connecting bands of the exhaust strap are joined to the driver-side wall at the position closer to the center of the driver-side wall compared with the position of the vent hole, and in a symmetrical fashion with respect to the center region of the driver-side wall, as viewed from the part of the driver-side wall at full deployment of the airbag. With this configuration, when the driver moves towards the lower end of the rim of the steering wheel in the event of an impact and bumps the airbag as deployed and pushes the airbag forward, an amount of forward movement of a vicinity of the center of the driver-side wall will be generally uniform whether the steering wheel is steered straight ahead or it is 180° turned, since a rotation center of the steering wheel is generally coincident with the center of the driver-side wall. That is, regardless of the steering angle of the steering wheel, a loosening amount of the connecting bands at cushioning the driver will be generally steady and the vent hole will open in a steady fashion, thus steadying the air venting property of the vent hole.

Moreover, when the airbag as deployed is viewed from the side, an opening plane of the outer opening and inner opening is such that an outer edge located away from the inlet opening rises from an inner edge located close to the inlet opening, and is closer to the vicinity of the center of the driver-side wall. If, especially, elongated tethers are adopted to allow an increased clearance between the vehicle-side wall and driver-side wall, the airbag viewed from the side will be more spherical, and the outer edge of the opening plane of the vent hole will be located even closer to the vicinity of the center of the driver-side wall.

However, in the airbag device of the present invention, since the length of the distant edge of the exhaust strap is shorter than the length of the proximate edge, even if the outer edge of the opening plane of the vent hole (especially, an outer edge of the opening plane of the outer opening) is deployed close to the vicinity of the center of the driver-side wall, the distant edge of the cover section of the exhaust strap will be prevented from slipping out of the outer opening at airbag deployment. That is, the distant edge of the cover section will be prevented from loosening and opening the vent hole when the airbag simply completes deployment. If the length of the distant edge of the exhaust strap is the same as that of the proximate edge in a situation where the airbag is configured to inflate such that the outer edge of the opening plane of the outer opening be located close to the vicinity of the center of the driver-side wall, the distant edge of the exhaust strap will be allowed a room to slack by a distance that the outer edge of the outer opening is located closer to the center of the driver-side wall, and the distant edge region of the cover section will be likely to slack and slip out of the outer opening to open the vent hole before the airbag cushions the driver.

Needless to say, the difference between the lengths of the distant edge and proximate edge may be determined according to the thickness of the airbag as inflated (in other words, according to the clearance between the vehicle-side wall and the driver-side wall to be limited by the tether, or the length of the exhaust strap from the cover section to the joint to the center of the driver-side wall) within such a range that the cover section is capable of closing off the vent hole at airbag deployment and is also openable when the airbag cushions the driver.

Therefore, the airbag device for a driver's seat of the invention is stable in the air venting property of the vent hole. In other words, due to the configuration that the connecting bands of the exhaust strap are joined to the vicinity of the center of the driver-side wall, the airbag device will be stable in an opening property of the vent hole regardless of the steering angle the steering wheel. Further, due to the configuration that the length of the distant edge of the exhaust strap is shorter than that of the proximate edge by a predetermined difference of length, the airbag device of the invention will have scarce fear of an unexpected opening of the vent hole before the airbag cushions the driver.

In the airbag device for a driver's seat of the invention, it is desired that:
the exhaust strap is composed of two separate components that are joined together at an intermediate region of each of the connecting bands; a vehicle-side component and a driver-side component; and
the vehicle-side component includes the cover section and a pair of vehicle-side connecting regions extending from the opposite sides of the cover section and forming regions of the connecting bands adjoining the cover section, while the driver-side component includes a pair of driver-side connecting regions to be joined to the vehicle-side connecting regions and a joint region that connects the driver-side connecting regions to the driver-side wall.

With this configuration, the exhaust strap will be formed easily by joining each of the vehicle-side component and driver-side component to the vehicle-side wall/driver-side wall, joining the vehicle-side wall and driver-side wall together by the respective outer peripheral edges, and joining each of the vehicle-side connecting regions and each of the driver-side connecting regions.

In this instance, the length of the distant edge of the exhaust strap will be easily made shorter than that of the proximate edge by, in either one of or both of the vehicle-side connecting regions of the vehicle-side component and the driver-side connecting regions of the driver-side component, adjusting the lengths of the edges on a part close to the inlet opening and on a part away from the inlet opening. The difference of lengths between the distant edge and proximate edge of the exhaust strap may also be adjusted by joining the vehicle-side connecting regions of the vehicle-side component and the driver-side connecting regions of the driver-side component at such a jointing angle as to make the length of the distant edge of the exhaust strap shorter than that of the proximate edge.

In the airbag device for a driver's seat of the invention, it is also desired that:

another pair of tethers out of the tethers serves as a regulating strap only for regulating the clearance between the vehicle-side wall and driver-side wall;

the regulating strap includes a vehicle-side joint region that is joined to the vehicle-side wall at a position point-symmetrical with the inner face region with respect to the inlet opening and a pair of connecting bands extending from opposite edges of the vehicle-side joint region and joined to the driver-side wall;

the connecting bands of the regulating strap are joined to the driver-side wall at a position closer to the center of the driver-side wall compared with the position of the vehicle-side joint region and in a symmetrical fashion with respect to a center region of the driver-side wall, as viewed from the part of the driver-side wall at full deployment of the airbag; and the connecting bands of the regulating strap and connecting bands of the exhaust strap are deployable evenly radially with respect to the center of the driver-side wall.

This configuration will enable the exhaust strap and regulating strap to regulate the clearance between the vehicle-side wall and driver-side wall in a balanced fashion in cooperation at airbag deployment.

In an instance where the airbag is provided with both of the exhaust strap and regulating strap, it is desired that the regulating strap is composed of two separate components separate in the connecting bands; a vehicle-side component and a driver-side component, in a similar fashion to the exhaust strap. Specifically, it is conceivable to configure such that the vehicle-side component of the regulating strap includes the vehicle-side joint region and a pair of vehicle-side connecting regions extending from opposite sides of the vehicle-side joint region and forming regions of the connecting bands of the regulating strap adjoining the vehicle-side joint region, while the driver-side component of the regulating strap includes a pair of driver-side connecting regions to be joined to the vehicle-side connecting regions of the vehicle-side component of the regulating strap and a joint region that connects the driver-side connecting regions of the regulating strap to the driver-side wall. In this instance, it is further desired that the vehicle-side component of the exhaust strap and the vehicle-side component of the regulating strap are provided in an integrated fashion as a shared vehicle-side component, in which a reinforcing region to be sewn to a periphery of the inlet opening is disposed between the vehicle-side components of the exhaust strap and regulating strap, while the driver-side component of the exhaust strap and the driver-side component of the regulating strap are provided in an integrated fashion as a shared driver-side component.

With this configuration, the exhaust strap and regulating strap will be formed easily by joining each of the shared vehicle-side component and shared driver-side component to the vehicle-side wall/driver-side wall, joining the vehicle-side wall and driver-side wall together by the respective outer peripheral edges, and joining corresponding connecting regions of the shared vehicle-side component and shared driver-side component. This configuration will also help reduce the number of parts of the airbag and reduce the labor hour for producing the airbag.

BRIEF DESCRIPTION OF DRAWINGS

FIG. 14A is a schematic vertical section of the airbag device of the first embodiment at airbag deployment as a steering wheel is steered straight ahead;

FIG. 14B is a schematic vertical section of the airbag device of the first embodiment at airbag deployment as the steering wheel is 180° turned.

DESCRIPTION OF PREFERRED
EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
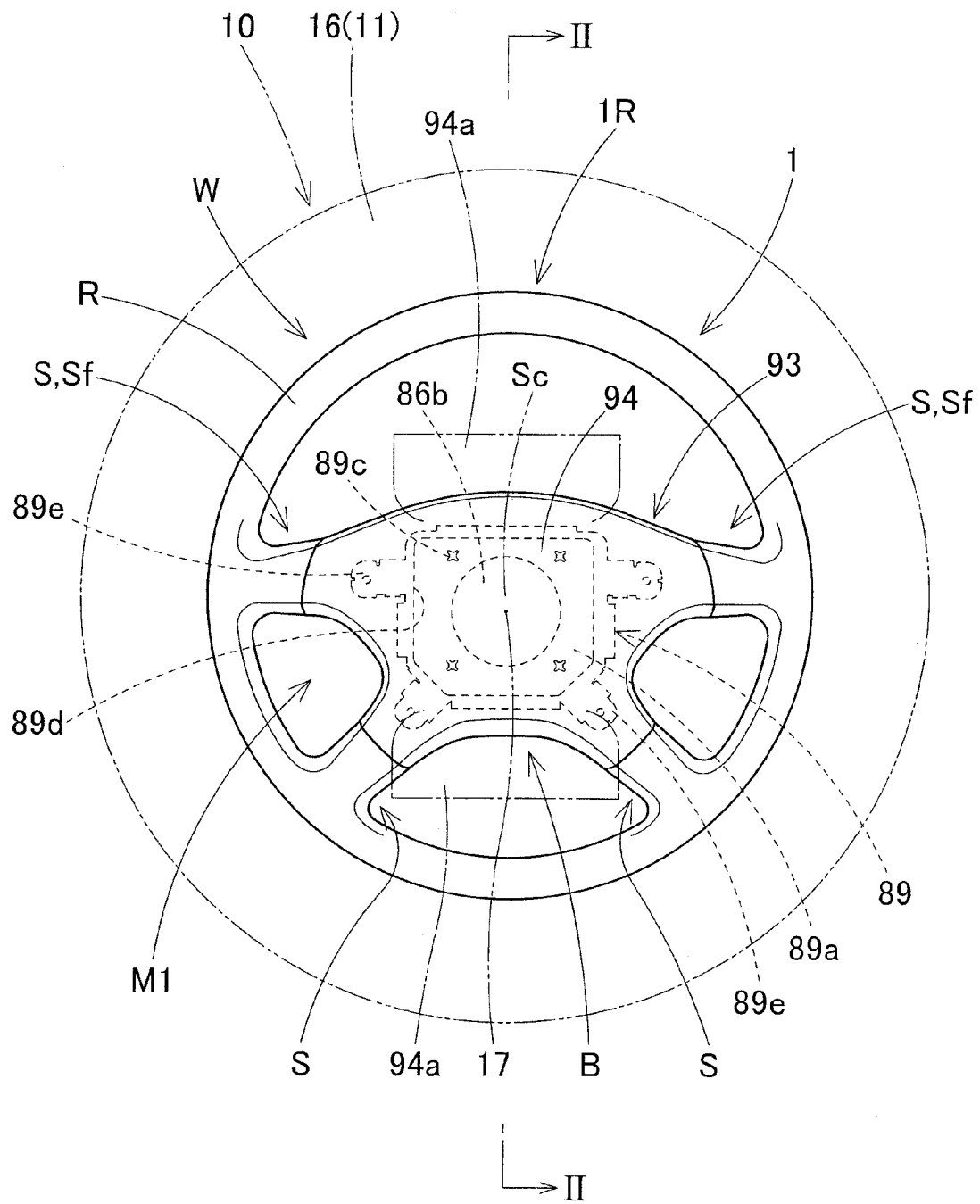
FIG. 1 is a plan view of an airbag device for a driver's seat according to the first embodiment of the invention in service.
Figure 2:
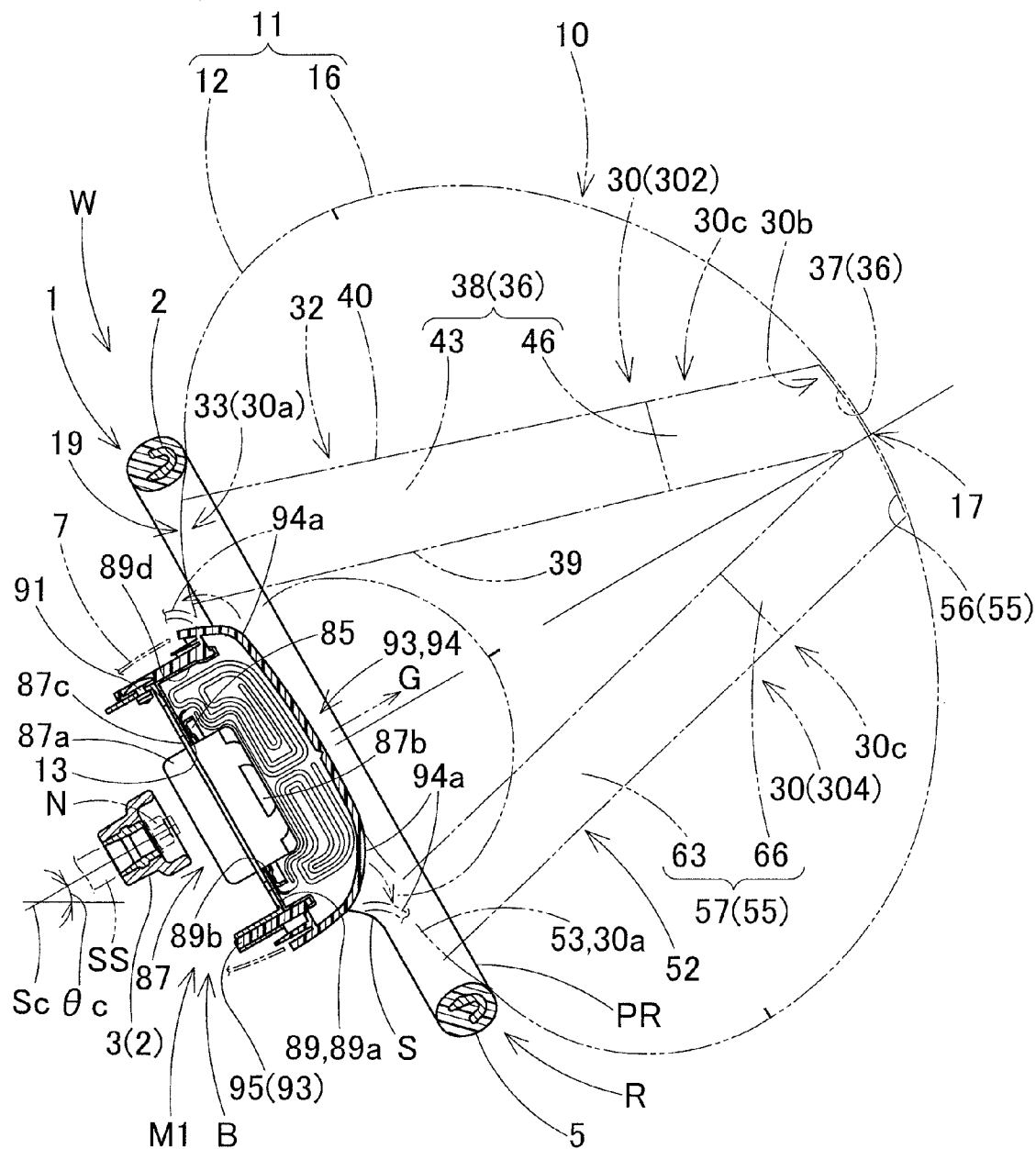
FIG. 2 is a schematic vertical section of the airbag device of FIG. 1 taken along line II-II of FIG. 1.

As shown in FIGS. 1 and 2, an airbag device M1 for a driver's seat according to the first embodiment of the present invention is mounted on a steering wheel W. The steering wheel W includes a wheel body 1 and airbag device M1 disposed on top of a boss section B at the center of the wheel body 1. The wheel body 1 includes an annular rim R, the boss section B and four spokes S. The rim R is for holding at steering operation. The boss section B is disposed at the center of the rim R and is secured to a steering shaft SS. The spokes S interconnect the boss section B and the rim R.

In this specification, unless otherwise specified, an up and down direction corresponds to an up and down direction extending along an axial direction of the steering shaft SS. A front and rear direction corresponds to a front and rear direction extending orthogonally to the axial direction of the steering shaft SS of a vehicle being steered straight ahead, and a left and right direction corresponds to a left and right direction extending orthogonally to the axial direction of the steering shaft SS of the vehicle being steered straight ahead.

As shown in FIGS. 1 and 2, the steering wheel body 1 includes a core 2 of such metal as aluminum base alloy, and the core 2 has such a contour that the rim R, boss section B and spokes S are interconnected. The core 2 is covered with a cladding layer 5 of synthetic resin on the rim R and regions of the spokes S adjoining the rim R. At an area of the core 2 corresponding to the boss section B is s a steel boss 3 through which the steering shaft SS is inserted and then fixed by a nut N. Underneath the wheel body 1 is a lower cover 7 made from synthetic resin for covering the lower side of the boss section B.

In the illustrated embodiment, an inclination angle θc (hereinafter referred to as a "column angle" θc, FIG. 2) of the steering shaft SS is 22.5°.

As shown in FIG. 2, the airbag device M1 includes an airbag 10, which is folded up, an inflator 87 for supplying the airbag 10 with an inflation gas, an airbag cover 93 covering an upper side of the airbag 10, a case 89 housing the airbag 10 and the inflator 87 and supporting the airbag cover 93, and a retainer 85 used to attach the airbag 10 to the case 89 together with the inflator 87.

The retainer 85, which is made of a sheet metal, has a square annular contour and holds down a peripheral area of a later-described inlet opening 13 of the airbag 10. The retainer 85 is provided at the four corners with unillustrated bolts, with which the retainer 85 mounts the airbag 10 and the inflator 87 on the case 89.

The inflator 87 includes a body 87a and a flange 87c. The inflator body 87a is in the form of a pot and is provided on the upper region with a plurality of gas discharge ports 87b. The flange 87c protrudes out of an outer circumference of the body 87a and has unillustrated through holes for receiving the unillustrated bolts of the retainer 85.

As shown in FIGS. 1 and 2, the case 89 is made of sheet metal and formed into a generally rectangular parallelepiped shape. The case 89 includes a rectangular bottom wall 89a and a side wall 89d extending upward from an outer peripheral edge of the bottom wall 89a. The case 89 is disposed above the boss section B of the steering wheel W, and serves as a housing of the airbag 10. The bottom wall 89a is provided with a circular insert hole 89b for receiving the body 87a of the inflator 87 from the lower side. Around the insert hole 89b are four through holes 89c for receiving the bolts of the retainer 85. At the upper end of the side wall 89d are mounting sections 89e extending outwardly. Unillustrated mounting bases of an unillustrated horn switch mechanism are attached to the mounting sections 89e, and the case 89 is secured to the core 2 of the steering wheel W with the aid of the mounting bases. As a result, the airbag device M1 is mounted on top of the boss section B of the steering wheel body 1 which is attached to the steering shaft SS. Moreover, a later-described side wall 95 of the airbag cover 93 is attached to the side wall 89d of the case 89 with rivets 91 or the like.

The airbag cover 93 is fabricated of synthetic resin and includes a ceiling wall 94 covering the airbag 10 from above and a side wall 95 having a generally square tubular shape extending downward from a vicinity of an outer peripheral edge of the ceiling wall 94. The ceiling wall 94 includes two doors 94a which are openable forward and rearward, respectively, when pushed by the inflated airbag 10.

The airbag 10 is made of a fabric woven with polyamide yarn, polyester yarn or the like, and is inflatable into such a shape as is round when viewed from above and generally oval similar to a circle when viewed from a side, as indicated by double-dotted lines in FIGS. 1 and 2. Referring to FIGS. 2 to 7 and 9, a circumferential wall 11 of the airbag 10 is composed of a vehicle-side wall 12, which is deployable towards the steering wheel body 1 (towards the rim R), and a driver-side wall 16, which is deployable to face a driver D.

Figure 3:
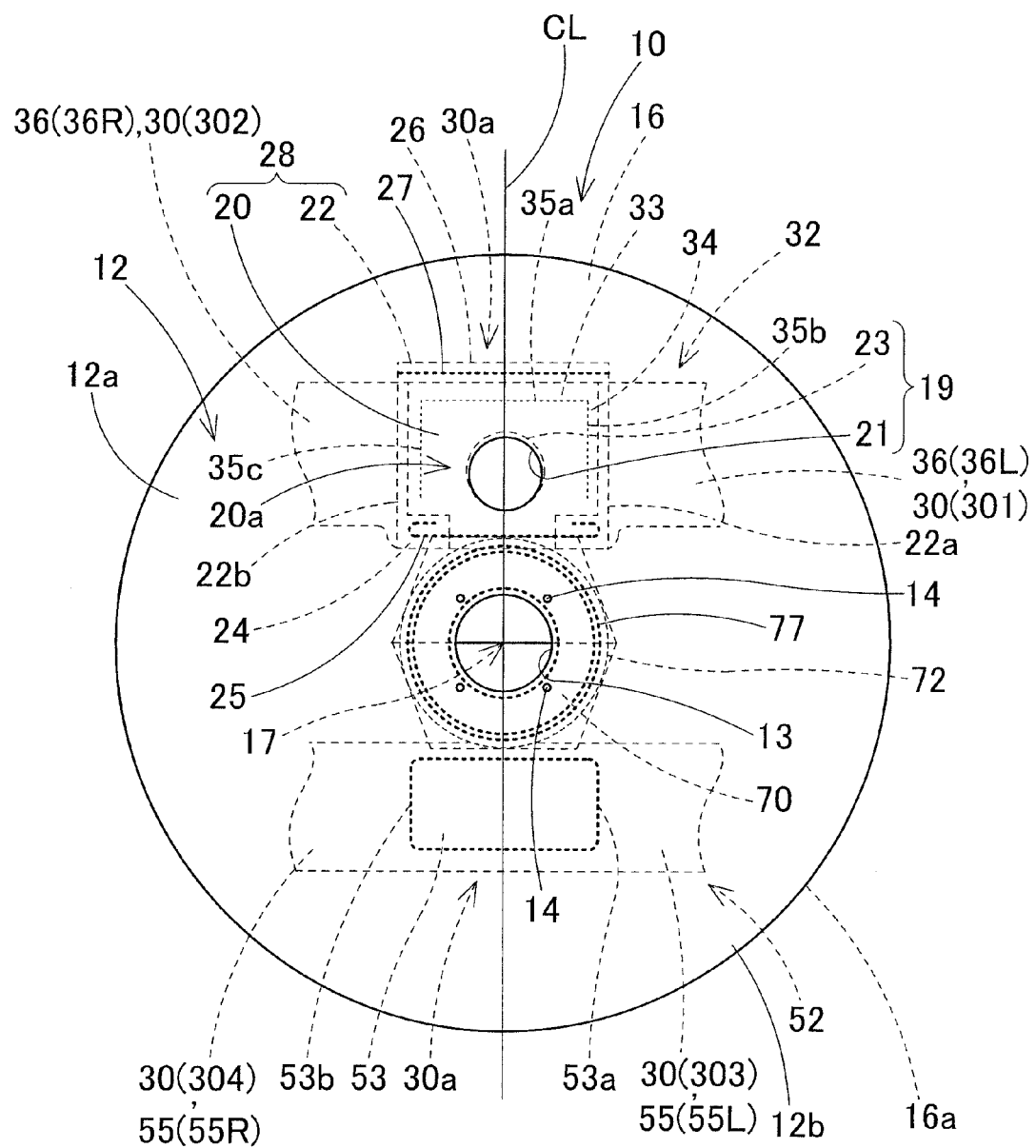
FIG. 3 is a bottom view of an airbag of the first embodiment.

The vehicle-side wall 12 and driver-side wall 16 are formed into an identical round contour, and the vehicle-side wall 12 is provided at the center with a round inlet opening 13 for introducing an inflation gas. The circumferential wall 11 is formed by sewing the vehicle-side wall 12 and driver-side wall 16 together at the outer peripheries 12b and 16a. Around the inlet opening 13 are formed mounting holes 14 for receiving the bolts of the retainer 85 to mount the airbag 10 on the bottom wall 89a of the case 89, as shown in FIGS. 3 and 15.

Figure 4:
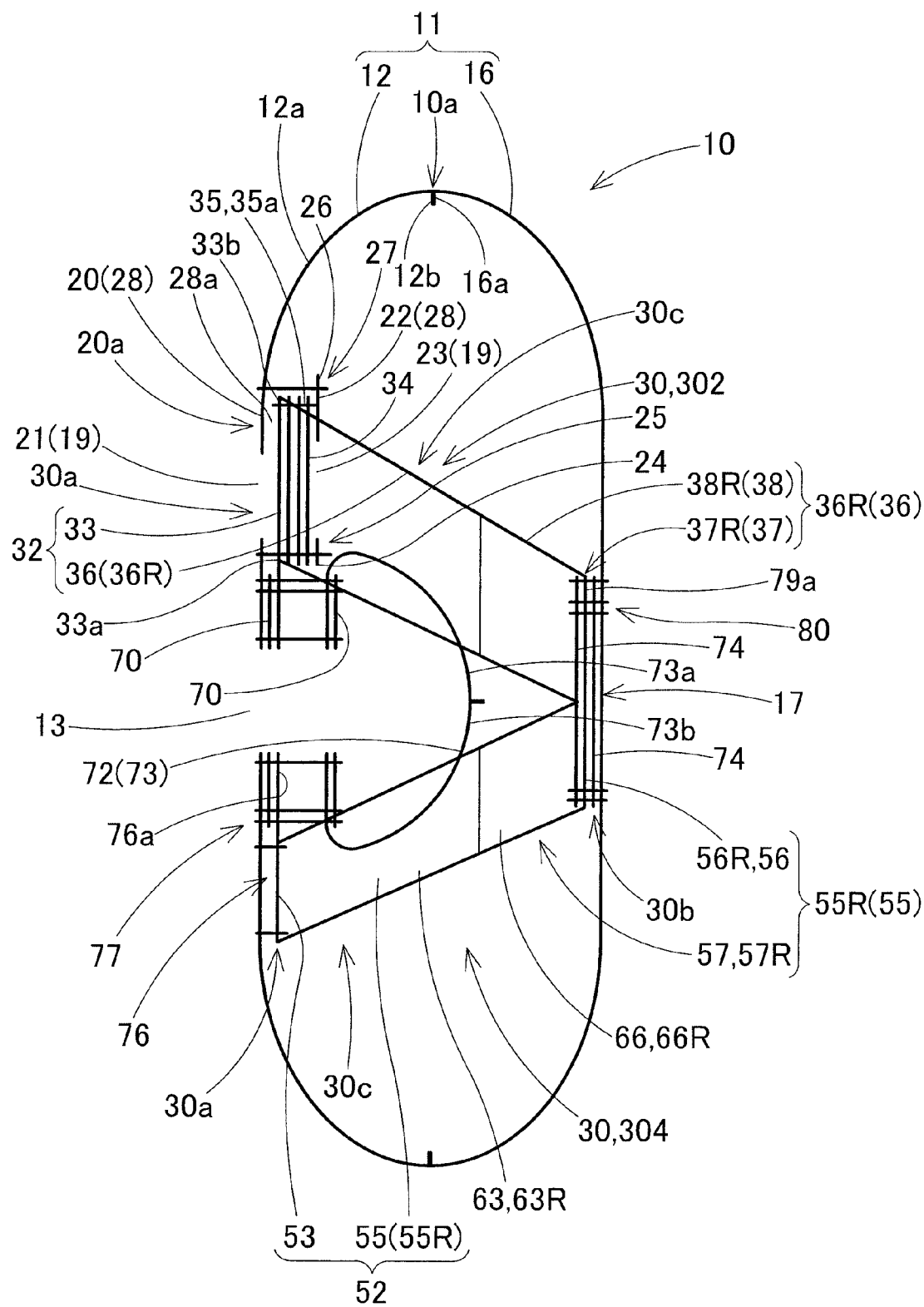
FIG. 4 is a schematic vertical section of the airbag of FIG. 3.
Figure 15:
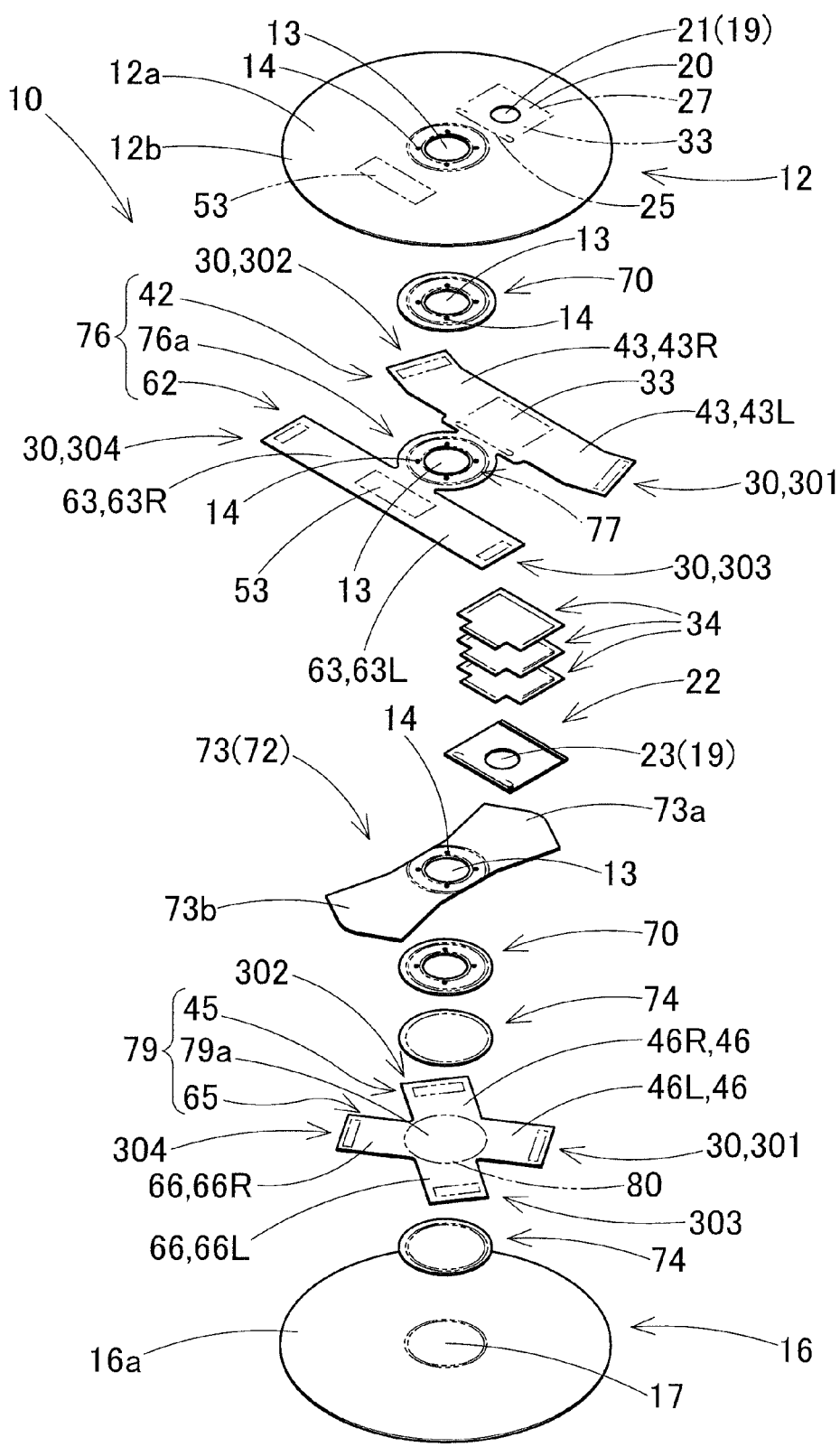
FIG. 15 schematically depicts components of the airbag of the first embodiment by perspective views.

As shown in FIGS. 4 and 15, a reinforcing cloth 70, a redirecting cloth 72 and a shared vehicle-side component 76 are sewn to the periphery of the inlet opening 13 as described later. The inlet opening 13 and mounting holes 14 are also formed on these members.

Referring to FIGS. 3, 4, 7 and 15, the airbag 10 includes four tethers 30 (301, 302, 303 and 304) that connect the vehicle-side wall 12 and driver-side wall 16 for regulating a clearance between the vehicle-side wall 12 and driver-side wall 16 at airbag deployment.

The vehicle-side wall 12 is provided, in front of the inlet opening 13, with a vent hole 19 for exhausting an inflation gas, as shown in FIGS. 3 to 5, 9 to 11 and 14A to 15. The vent hole 19 is composed of an outer opening 21 which is formed on an outer face region 20 of the vehicle-side wall 12 and an inner opening 23 which is formed on an inner face region 22 of the vehicle-side wall 12 in such a manner as to overlap with the outer opening 21. The outer face region 20 forms an outer shell of the vehicle-side wall 12 at the location of the vent hole 19 and the inner face region 22 is arranged on an inner side of the outer face region 20. Although both of the outer opening 21 and inner opening 23 are circular, the inner opening 23 is slightly greater than the outer opening 21.

In the first embodiment, the outer face region 20 forms a main body 12a of the vehicle-side wall 12 and has a circular outer contour identical to the driver-side wall 16. That is, the circumferential wall 11 of the airbag 10 is formed by sewing the outer peripheral edge 12b of the outer face region 20 and outer peripheral edge 16a of the driver-side wall 16 together. The inner face region 22 is formed into a rectangular plate shape elongated in a left and right direction and so sized as to cover the outer opening 21 and its periphery, and is sewn to an inner plane of the outer face region 20.

Figure 5:
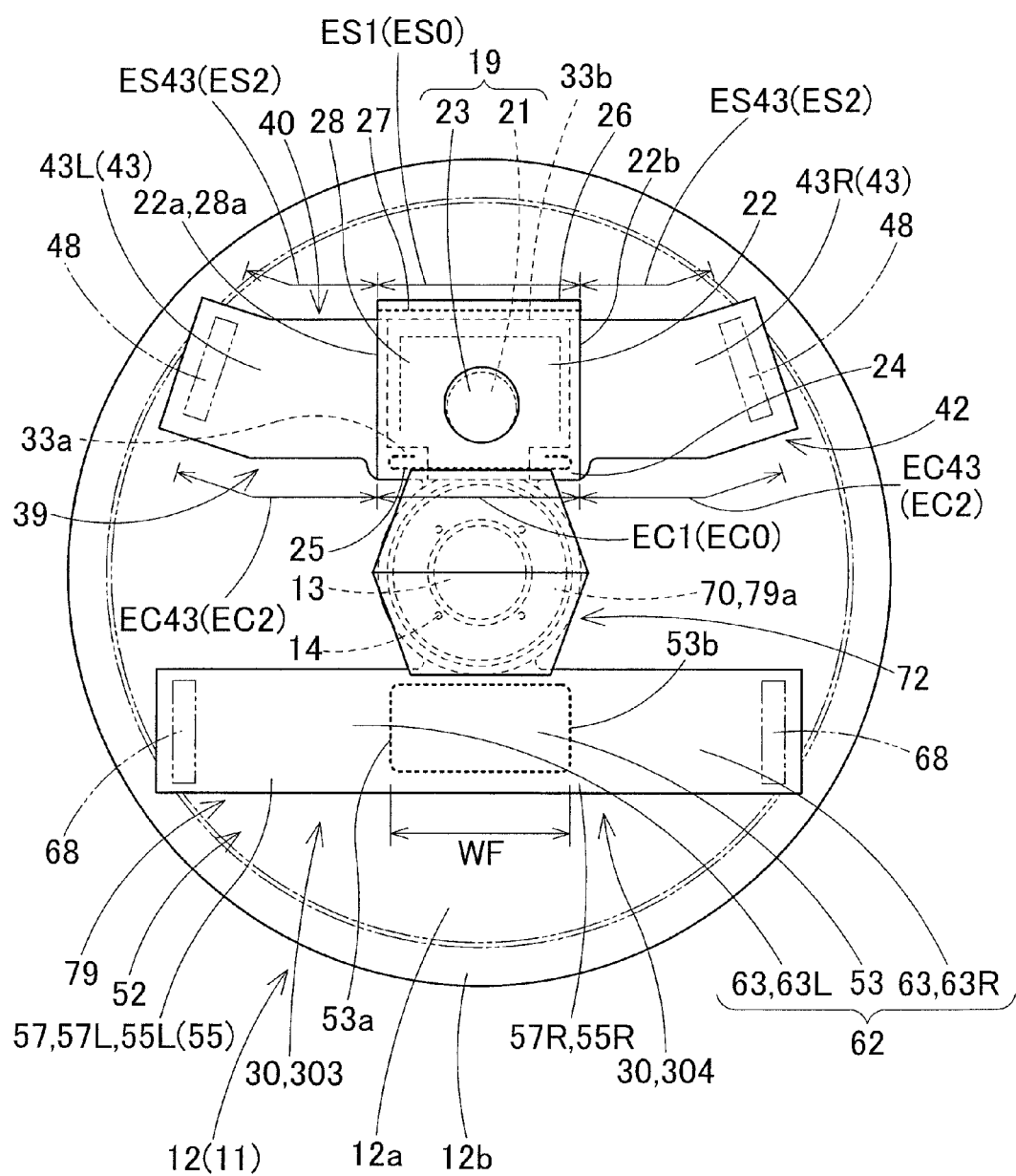
FIG. 5 is a plan view of a vehicle-side wall of the airbag of FIG. 3 before sewn together with a driver-side wall, with other components on the part of the vehicle-side wall.

As shown in FIGS. 3 to 5, the inner face region 22 is sewn to the outer face region 20 by the inner edge 24 facing towards the inlet opening 13 and the outer edge 26 facing away from the inlet opening 13 with seams 25 and 27. The seams 25 and 27 are each formed into a straight line extending orthogonally to a straight line (or center line) CL (FIG. 3) connecting the centers of the inlet opening 13 and vent hole 19. Since the straight line CL extends along a front and rear direction, the seams 25 and 27 extend along a left and right direction, and form a tubular guide section 28 between the outer face region 20 and inner face region 22, provided with a through hole 28a extending in a left and right direction.

The center 17 of the driver-side wall 16 is generally coincident with the steering shaft SS as viewed from the part of the driver-side wall 16 at full inflation of the airbag 10 as mounted on the vehicle, in other words, generally coincident with a rotation center Sc (FIGS. 1 and 2) of the rim R of the steering wheel W. More particularly, as shown in FIGS. 1 and 2, the center 17 of the driver-side wall 16 is located slightly to the rear of the rotation center Sc of the steering wheel W.

Out of the tethers 30, a pair of the tethers 301 and 302 disposed at the front side serve as an exhaust strap 32 which opens and closes the vent hole 19, while another pair of the tethers 303 and 304 disposed at the rear side serve only as a regulating strap 52 which regulates a clearance between the driver-side wall 16 and vehicle-side wall 12 (FIGS. 4 to 7 and 14A to 15).

The exhaust strap 32 includes a cover section 33 in the form of a rectangular plate and a pair of connecting bands 36 (36L and 36R) extending from opposite sides of the cover section 33 and joined to the driver-side wall 16.

The cover section 33 closes off the outer opening 21 (or vent hole 19) in an openable fashion, and is placed between the outer face region 20 and inner face region 22 in such a manner as to be passed through the through hole 28a of the guide section 28. A distant edge 33b of the cover section 33, which is distant from the inlet opening 13, is not joined to the vehicle-side wall 12 whereas a proximate edge 33a of the cover section 33, which is closer to the inlet opening 13, is sewn to the inner edge 24 of the inner face region 22 (i.e., to the vehicle-side wall 12) with the seam 25.

Figure 7:
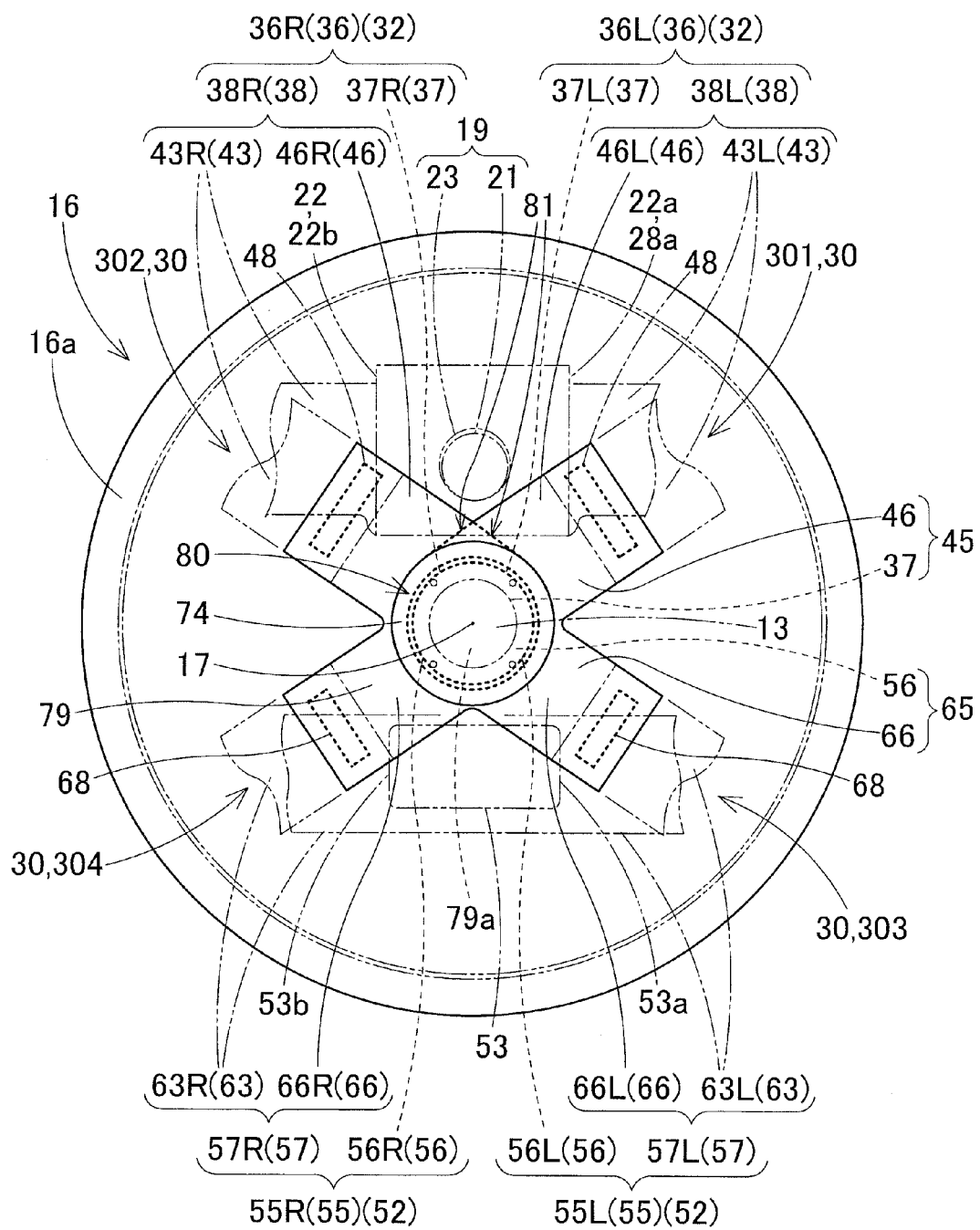
FIG. 7 is another bottom view of the driver-side wall of the airbag of FIG. 3 before sewn together with the vehicle-side wall, with other components on the part of the driver-side wall.

Each of the connecting bands 36L and 36R includes a band body 38 (38L/38R) extending from left/right side of the cover section 33 and a driver-side joint region 37 disposed at the leading end of the band body 38 to be joined to the driver-side wall 16. Each of the left and right band bodies 38 (38L/38R) protrudes out of the left/right edge 22a/22b of the inner face region 22, which is distant from the vent hole 19, as shown in FIGS. 5 and 7, and the driver-side joint regions 37 (37L and 37R) are joined to a position (positions) on the driver-side wall 16 closer to the center 17 of the driver-side wall 16 compared with the position of the vent hole 19, and in a symmetrical fashion with respect to a center region of the driver-side wall 16, as viewed from above the driver-side wall 16 at full deployment of the airbag 10. The driver-side joint regions 37L and 37R are joined to the driver-side wall 16 with a double annular seam 80 formed around the center 17 of the driver-side wall 16. More particularly, the driver-side joint region 37L is composed of a left front, generally quarter circular arc region of the annular seam 80, while the driver-side joint region 37R is composed of a right front, generally quarter circular arc region of the seam 80.

Figure 9:
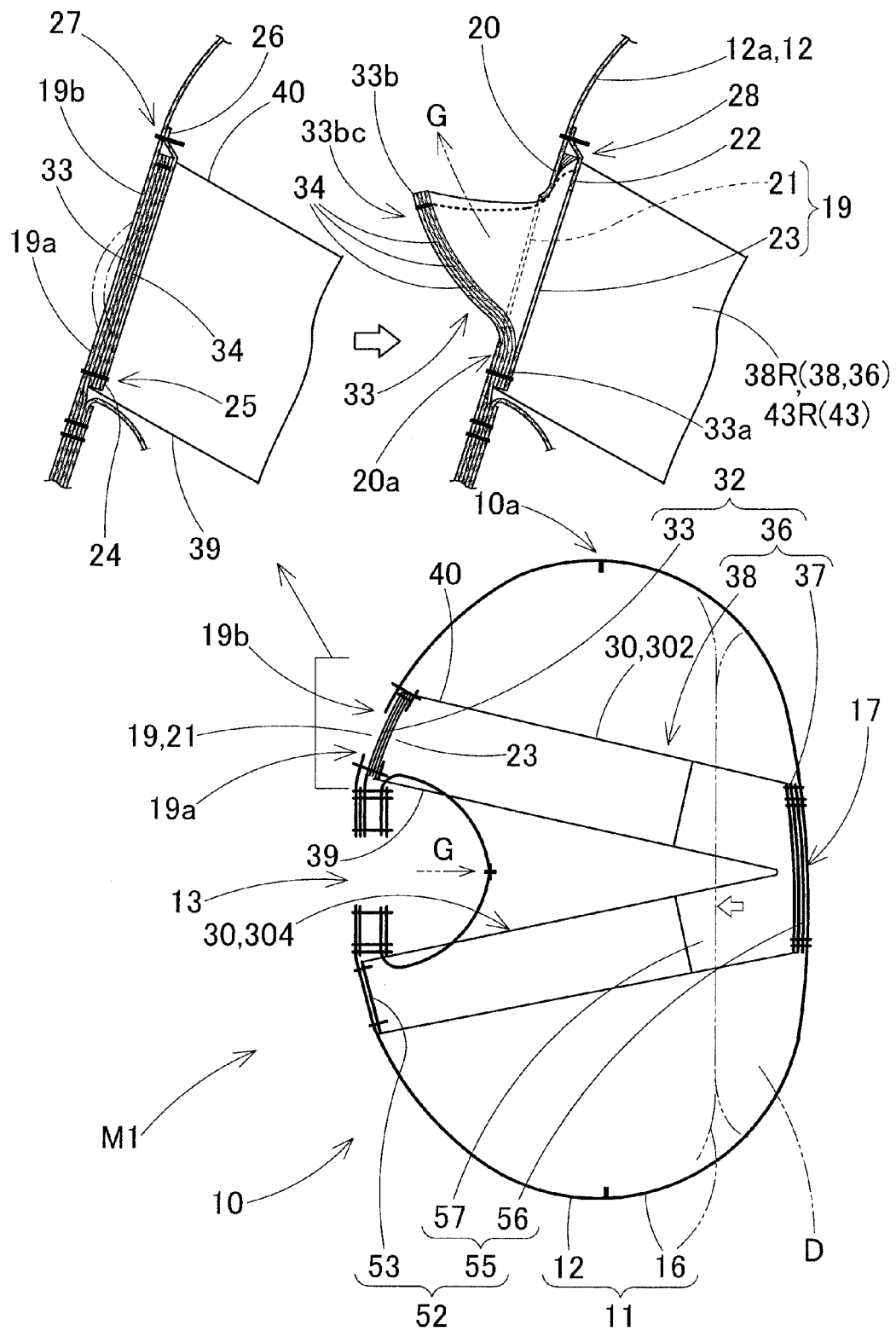
FIG. 9 is a schematic vertical section of the airbag of the first embodiment and also shows the way a vent hole is opened.
Figure 10A:
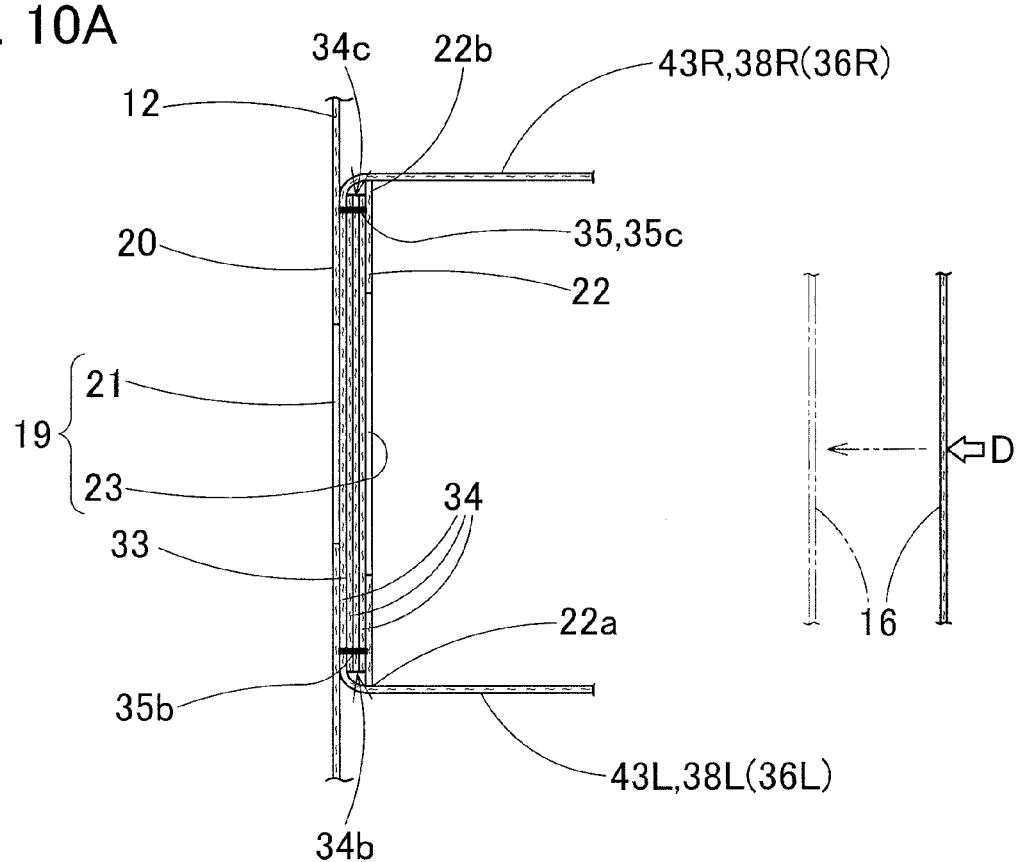
FIGS. 10A and 10B are schematic sectional views of the airbag of the first embodiment showing the way the vent hole is opened.

Since the cover section 33 of the exhaust strap 32 is held by the inner face region 22 from moving towards the driver-side wall 16 at airbag deployment, the connecting bands 36 joined to the driver-side wall 16 limits the clearance between the vehicle-side wall 12 and driver-side wall 16. If the driver-side wall 16 cushions the driver D after the airbag 10 has been fully inflated, the driver-side wall 16 moves toward the vehicle-side wall 12 and the connecting bands 36L and 36R loosen as shown in FIGS. 9 and 10. In the meantime, the cover section 33 receives an internal pressure of the airbag 10 through the inner opening 23 and the distant edge 33b region of the cover section 33, which is not joined to the vehicle-side wall 12, passes through the outer opening 21 and gets out on an outer circumferential plane 20a of the outer face region 22, which provides gas communication between the outer opening 21 on the outer face region 20 and inner opening 23 on the inner face region 22, thus opening the vent hole 19 and releasing an extra inflation gas G therefrom.

Referring to FIG. 5, the exhaust strap 32 includes a proximate edge 39 disposed on a part proximate to the inlet opening 13 and a distant edge 40 disposed on a part distant from the inlet opening 13. The length ES0 of the distant edge 40 is shorter than the length EC0 of the proximate edge 39. Here, the length ES0/EC0 of the distant edge 40/proximate edge 39 is intended to refer to a sum of the length of a distant edge 33b/proximate edge 33a of the cover section 33 and lengths of the distant edges/proximate edges of the left and right band bodies 38L and 38R of the connecting bands 36L and 36R. Needless to say, the difference between the lengths EC0 and ES0 is so configured that the cover section 33 is capable of closing off the vent hole 19 at airbag deployment and is also openable when the airbag 10 cushions the driver D.

As described later, in the illustrated embodiment, each of the band bodies 38L and 38R is formed by connecting a vehicle-side connecting region 43L/43R of a vehicle-side component 43 and a driver-side connecting region 46L/46R of a driver-side component 45. Accordingly, the length EC0 of the proximate edge 39 is a sum of the length EC1 of the proximate edge 33a of the cover section 33, length EC2 (EC43+EC43) of the vehicle-side connecting regions 43L and 43R and length EC3 (EC46+EC46, FIG. 6) of the driver-side connecting regions 46L and 46R. The length EC1 of the proximate edge 33a of the cover section 33 is intended to refer to a length of a region of the cover section 33 covered with the inner face region 22 and held by the inner face region 22 (guide section 28). The length ES0 of the distant edge 40 is a sum of the length ES1 of the distant edge 33b of the cover section 33, length ES2 (ES43+ES43) of the driver-side connecting regions 43L and 43R and length ES3 (ES46+ES46, FIG. 6) of the driver-side connecting regions 46L and 46R.

Figure 6:
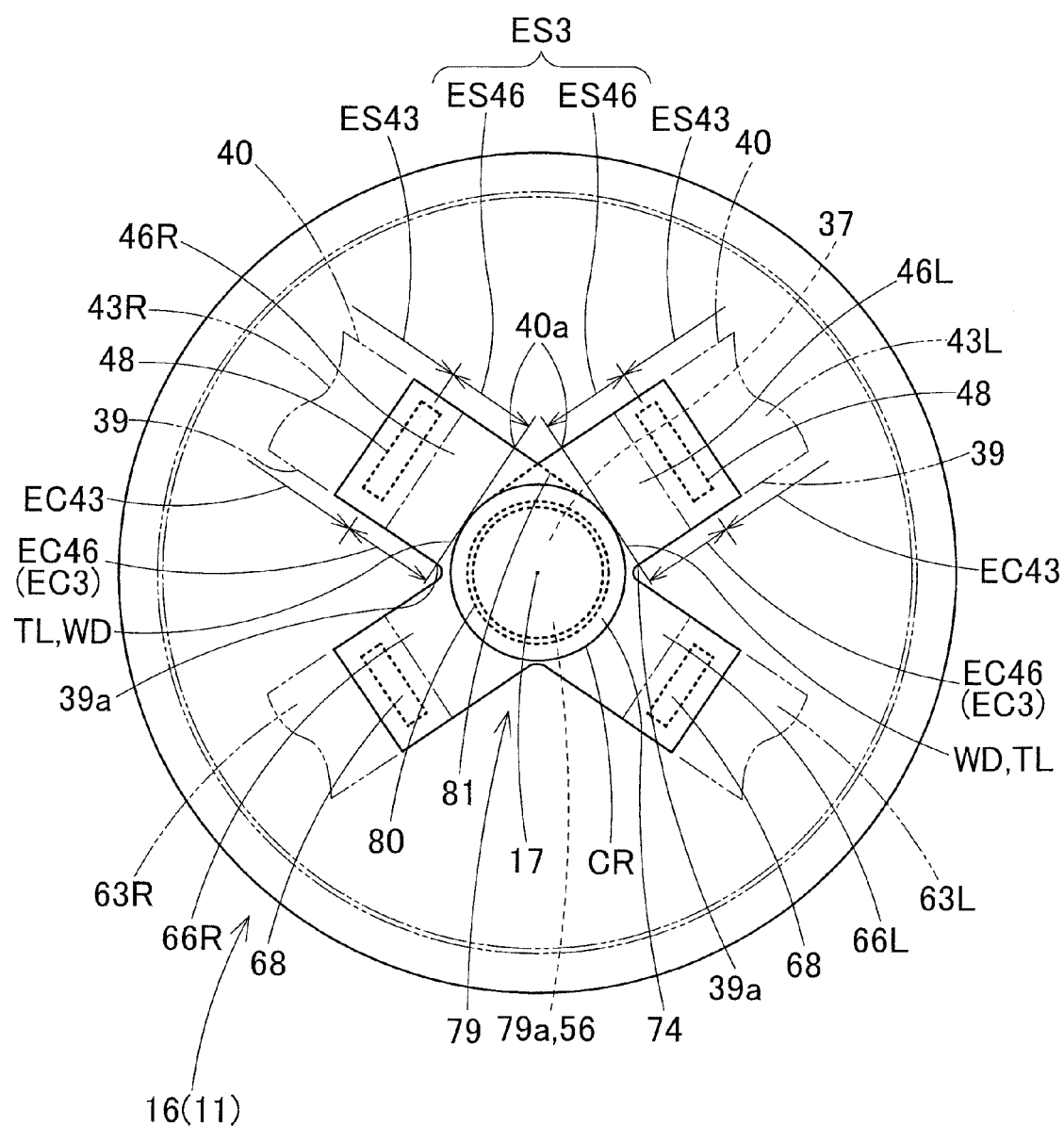
FIG. 6 is a bottom view of the driver-side wall of the airbag of FIG. 3 before sewn together with the vehicle-side wall, with other components on the part of the driver-side wall.

Referring to FIG. 6, the starting points 39a and 40a of the lengths EC46 and ES46 of the driver-side connecting regions 46L and 46R starting from the driver-side wall 16 are intersection points of the proximate edge 39/distant edge 40 and a straight line WD which extends across the connecting regions 46L and 46R at a position proximate to the driver-side joint region 37 where the connecting regions 46L and 46R maintain a predetermined width and where the straight line WD makes a tangential line TL of a circle CR centered at the center 17 of the driver-side wall 16.

In the first embodiment, the total length ES0 of the distant edge 40 including the cover section 33 and band bodies 38L and 38R is 600 mm, while the total length EC0 of the proximate edge 39 including the cover section 33 and band bodies 38L and 38R is 680 mm. That is, the proximate edge 39 and distant edge 40 have each 40 mm difference on the left and right sides, and a 80 mm difference as a whole.

In the first embodiment, the difference in length between the proximate edge 39 and distant edge 40 is made by forming each of the band bodies 38L and 38R into such a bent shape as to bend at a vicinity of the cover section 33 and draw away from the inlet opening 13. In this specific embodiment, the exhaust strap 32 is prepared in such a cut shape that opposite end 43a and 43b regions bend at bent regions 43c (FIG. 8) towards directions away from the inlet opening 13. Alternatively, the difference in length may also be made by preparing band bodies 38L and 38R in the form of a straight band and forming a tucked portion only in the distant edge 40 in both of the band bodies 38L and 38R at vicinities of the cover section 33 such that the opposite edges 43a and 43b bend towards directions away from the inlet opening 13.

The cover section 33 is provided with a reinforcing cloth 34 serving as a reinforcing element which prevents the distant edge 33b from slipping towards the proximate edge 33a while allowing the distant edge 33b to flex to pass through the outer opening 21 to open the vent hole 19. In the first embodiment, the reinforcing cloth 34 is formed of a woven fabric similar to the cover section 33 into a generally rectangle slightly smaller than the cover section 33, and is sewn to the cover section 33 (FIGS. 4, 8, 10 and 15) with a seam 35. The cover section 33 of the first embodiment is provided with three pieces of such reinforcing cloth 34. The reinforcing cloths 34 are applied to and sewn to the cover section 33 by the outer peripheral edges such that the outer peripheral edges are disposed between the outer face region 20 and inner face region 22. The reinforcing cloths 34 are joined to a plane of the cover section 33 facing towards the inner face region 22 (i.e., towards an interior of the airbag 10).

The seam 35 sewing each of the reinforcing cloths 34 to the cover section 33 is formed into an inverse U shape with a pair of straight regions 35b and 35c extending generally in parallel to the straight line CL connecting the inlet opening 13 and vent hole 19 at left and right edges 34b and 34c of the cover section 33 and a straight region 35a connecting the leading ends of the straight regions 35b and 35c at the outer edge 34a disposed at the distant edge 33b of the cover section 33.

Each of the reinforcing cloths 34 includes, at the inner edge 34d facing towards the inlet opening 13 (disposed proximate the proximate edge 33a), a small piece region 34c which protrudes out of the inner edge 34d and has a reduced width in a left and right direction. The inner edge 34d regions of the reinforcing cloths 34 are sewn to the vehicle-side wall 12 with the seam 25 which sews the cover section 33 to the vehicle-side wall 12.

As shown in FIGS. 4 to 7 and 15, the regulating tether 52 includes a generally rectangular vehicle-side joint region 53 and a pair of connecting bands 55 (55L and 55R) extending from opposite sides of the joint region 53 and joined to the driver-side wall 16.

The vehicle-side joint portion 53 is sewn to the vehicle-side wall 12 in such a rectangular shape that is bilaterally symmetrical about the center line CL passing through the inlet opening 13 and extending in a front and rear direction, and is disposed in a point-symmetrical fashion with the inner face region 22 with respect to the inlet opening 13.

Each of the connecting bands 55L and 55R includes a band body 57 extending from left/right end 53a/53b of the vehicle-side joint region 53 and a driver-side joint region 56 disposed at the leading end of the band body 57 to be joined to the driver-side wall 16. The driver-side joint regions 56 (56L and 56R) are joined to positions on the driver-side wall 16 closer to the center 17 region of the driver-side wall 16 compared with the vehicle-side joint portion 53 and bilaterally symmetrically about the center 17 region of the driver-side wall 16, as viewed from the side of the driver-side wall 16 at full deployment of the airbag 10. More particularly, the driver-side joint region 56L is composed of a left rear, generally quarter circular arc region of the afore-described annular seam 80, while the driver-side joint region 56R is composed of a right rear, generally quarter circular arc region of the seam 80.

Since the driver-side joint regions 37L, 37R, 56L and 56R of the exhaust strap 32 and regulating strap 52 are joined to the vicinity of the center 17 of the driver-side wall 16 in a symmetrical fashion in a front and rear direction and in a left and right direction (in other words, evenly radially, or symmetrical, about the center 17), the joints to the vehicle-side wall 12 of the exhaust strap 32 and regulating strap 52, i.e., the cover section 33 and vehicle-side joint region 53, each require a great width in a left and right direction in order that the exhaust strap 32 and regulating strap 52 regulate the clearance between the vehicle-side wall 12 and driver-side wall 16 in a balanced fashion. To this end, as shown in FIG. 5, the cover section 33 held between the left and right edges 22a and 22b of the inner face region 22 has a greater width (ES1) in a left and right direction than the inlet opening 13, and the vehicle-side joint region 53 also has a greater width (WF) in a left and right direction (i.e., a dimension between the left and right edges 53a and 53b) than the inlet opening 13, such that the exhaust strap 32 and regulating strap 52 regulate the clearance between the vehicle-side wall 12 and driver-side wall 16 in a balanced fashion.

In the first embodiment, the exhaust strap 32 is composed of two separate components; a vehicle-side component 42 and a driver-side component 45, which are joined together at the connecting bands 36L and 36R, between the cover section 33 and the driver-side joint regions 37. The vehicle-side component 42 includes the cover section 33 and a pair of vehicle-side connecting regions 43 (43L and 43R) extending from opposite sides of the cover section 33, which form regions of the connecting bands 36L and 36R adjoining the cover section 33 (FIG. 8). The driver-side component 45 includes a pair of driver-side connecting regions 46 (46L and 46R) to be joined to the vehicle-side connecting regions 43 (43L and 43R) and the driver-side joint regions 37 (37L and 37R) connecting the driver-side connecting regions 46L and 46R to the driver-side wall 16 (FIG. 7).

Likewise, as shown in FIGS. 7 and 8, the regulating strap 52 is composed of two separate components; a vehicle-side component 62 and a driver-side component 65, which are joined together at the connecting bands 55L and 55R, between the vehicle-side joint region 53 and driver-side joint regions 56.

The vehicle-side component 62 includes the vehicle-side joint region 53 and a pair of vehicle-side connecting regions 63 (63L and 63R) extending from opposite edges 53a and 53b of the vehicle-side joint region 53, which form regions of the connecting bands 55L and 55R adjoining the vehicle-side joint region 53. The driver-side component 65 includes a pair of driver-side connecting regions 66 (66L and 66R) to be joined to the vehicle-side connecting regions 63L and 63R and the driver-side joint regions 56 (56L and 56R) connecting the driver-side connecting regions 66L and 66R to the driver-side wall 16.

In the first embodiment, furthermore, the vehicle-side component 42 of the exhaust strap 32 and the vehicle-side component 62 of the regulating strap 52 are provided in an integrated fashion as a shared vehicle-side component 76 having a sheet shape. The shared vehicle-side component 76 has such a contour that a generally disc-shaped reinforcing region 76a to be sewn to the periphery of the inlet opening 13 is disposed between the vehicle-side components 42 and 62. The reinforcing region 76a is provided with an inlet opening 13 and mounting holes 14 in advance in a similar fashion to the vehicle-side wall 12.

Further, as shown in FIGS. 6 and 15, the driver-side component 45 of the exhaust strap 32 and the driver-side component 65 of the regulating strap 52 are provided in an integrated fashion as a shared driver-side component 79 having a sheet shape. The shared driver-side component 79 includes a disc-shaped joint base 79a in which the driver-side joint regions 37L, 37R, 56L and 56R are integrated.

The shared vehicle-side component 76 is sewn to the vehicle-side wall 12 by the reinforcing region 76a together with the reinforcing cloth 70 with a seam 77. The component 76 is sewn to the vehicle-side wall 12 also by the vehicle-side joint region 53 of the regulating tether 52. Further, the component 76 is sewn to the vehicle-side wall 12 by the inner edge 33a of the cover section 33 together with the inner face region 22.

The shared driver-side component 79 is sewn to the center 17 of the driver-side wall 16 by the joint base 79a with the annular seam 80 in such a manner that the joint base 79a is placed between two circular reinforcing cloths 74 as shown in FIG. 15. Since regions on the part of the distant edge 40 of the band bodies 38L and 38R are subjected to a stronger tension than corresponding regions on the part of the proximate edge 39 at airbag deployment, an additional auxiliary seam 81, which is in the form of a triangular ring, joins a region of the joint base 79a on the part of the distant edge 40 to the driver-side wall 16 for reinforcement, as shown in FIGS. 6 and 7.

The vehicle-side connecting regions 43L and 43R of the shared vehicle-side component 76 and corresponding driver-side connecting regions 46L and 46R of the shared driver-side component 79 are sewn together with square annular seams 48 (FIG. 6) to form the exhaust strap 32, while the vehicle-side connecting regions 63L and 63R of the shared vehicle-side component 76 and corresponding driver-side connecting regions 66L and 66R of the shared driver-side component 79 are sewn together with square annular seams 68 to form the regulating strap 52, thus forming the tethers 30 (301, 302, 303 and 304).

The airbag 10 of the first embodiment is further provided with a redirecting cloth 72 disposed around the inlet opening 13 for redirecting an inflation gas fed from the inflator 87 towards the left and right inside the airbag 10. The redirecting cloth 72 is formed by joining a cloth member 73 (FIG. 15) to the periphery of the inlet opening 13 on the vehicle-side wall 12 and sewing front and rear ends 73a and 73b of the cloth member 73 together.

The components of the airbag 10; the outer face region 20 (i.e., vehicle-side wall 12), inner face region 22, reinforcing cloths 34, 70 and 74, cloth member 73 for forming the redirecting cloth 72, shared vehicle-side component 76 and shared driver-side component 79, are fabricated of a flexible plain-weave fabric of such synthetic resin as polyamide or polyester, and suitably coated with silicone.

The vehicle-side connecting regions 43L and 43R of the vehicle-side component 42 (i.e., of the shared vehicle-side component 76) are each bent at the bent regions 43c such that opposite end 43a and 43b regions extend towards directions away from the inlet opening 13. The difference between a length of an edge disposed at an outside of the bending points 43c (i.e., of the proximate edge 39) and a length of an edge disposed at an inner side of the bent regions 43c (i.e., of the distant edge 40) forms the difference between the length EC0 of the proximate edge 39 and length ES0 of the distant edge 40 of the exhaust strap 32.

Figure 8A:
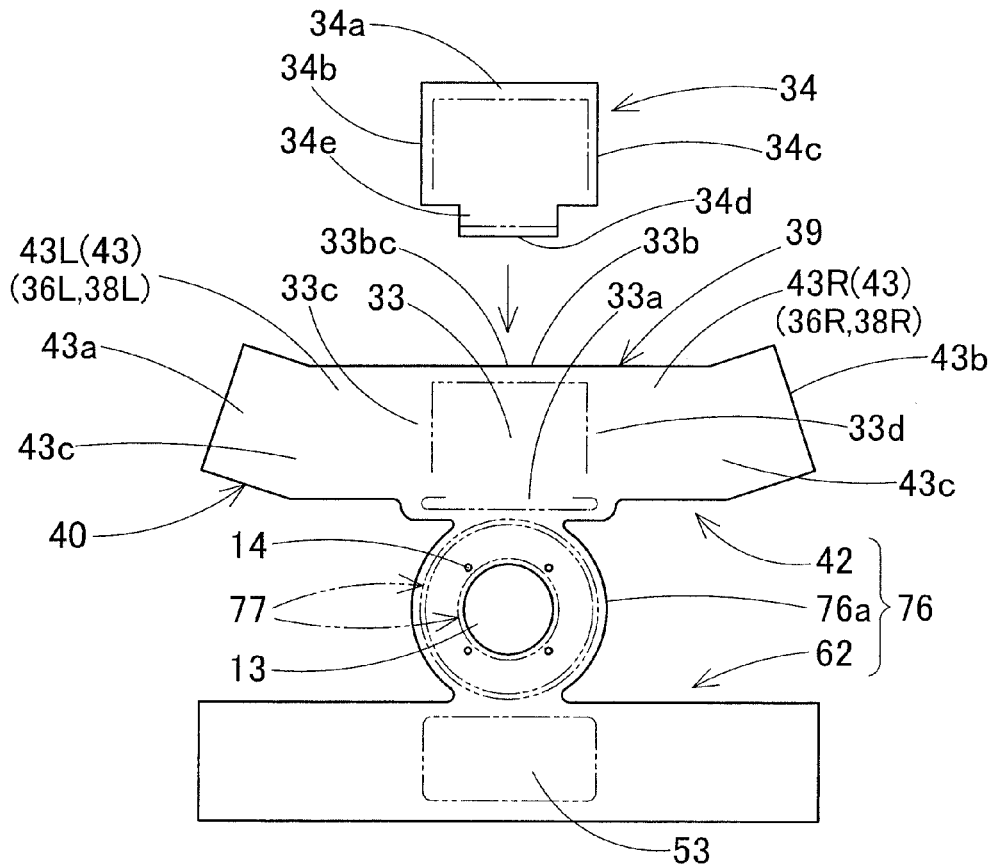
FIGS. 8A and 8B illustrate the way a reinforcing cloth is arranged on a shared vehicle-side component.
Figure 8B:
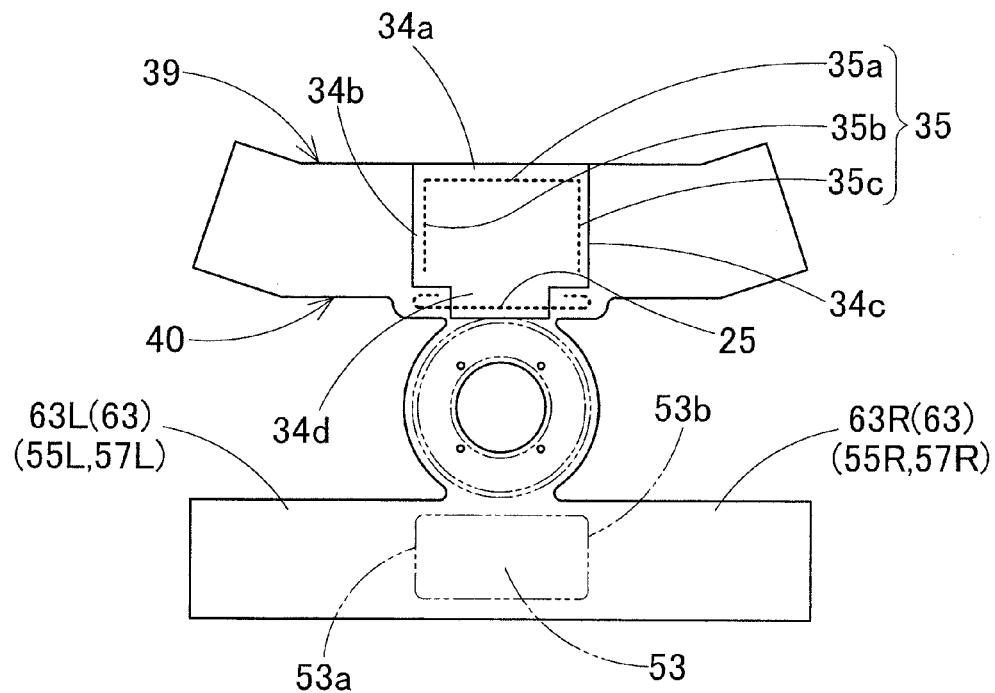

Production of the airbag 10 is now described. Firstly, the outer face region 20 as a vehicle-side wall 12 is prepared. The outer face region 20 is provided with an outer opening 21 in advance, but does not have an inlet opening 13 and mounting holes 14 yet. The three reinforcing cloths 34 are preliminarily sewn to the position of the cover section 33 on the shared vehicle-side component 76 with the seam 35, as shown in FIGS. 8A and 8B. Then, the reinforcing cloth 70, shared vehicle-side component 76 and the cloth member 73 for forming the redirecting cloth 72 are placed on a location of the inlet opening 13 on an inner plane of the outer face region 20 and sewn thereto with the seam 77. The shared vehicle-side component 76 is sewn to the outer face region 20 also by the vehicle-side joint region 53. Then the inlet opening 13 and mounting holes 14 are punched out.

Subsequently, an inner face region 22, which is provided with an inner opening 23 in advance, is placed over the cover section 33 and sewn to the outer face region 20 with seams 25 and 27. The seam 25 sews the reinforcing cloths 34 and cover section 33 to the outer face region 20 as well. Then the front and rear ends 73a and 73b (FIG. 4) of the cloth member 73 are sewn together to form the redirecting cloth 72 as shown in FIGS. 4 and 5.

On the part of the driver-side wall 16, the shared driver-side component 79 and reinforcing cloths 74 are placed on an inner plane of the center 17 of the driver-side wall 16 in such a fashion that the joint base 79a of the shared driver-side component 79 is sandwiched between the reinforcing cloths 74, and sewn thereto by the joint base 79a with the seam 80 and auxiliary seam 81, as shown in FIGS. 6 and 7.

Thereafter, the vehicle-side wall 12 and driver-side wall 16 are mated with the outer planes facing inward and sewn together by the outer peripheral edges 12b and 16a. Then the airbag 10 is reversed inside out via the inlet opening 13. Subsequently, the vehicle-side connecting regions 43L, 43R, 63L and 63R and driver-side connecting regions 46L, 46R, 66L and 66R are taken out of the inlet opening 13, and then the corresponding connecting regions 43L, 43R and 46L, 46R are sewn together with the seams 48 to form the exhaust strap 32, while the corresponding connecting regions 63L, 63R and 66L, 66R are sewn together with the seams 68 to form the regulating strap 52. If then the sewn-up regions 48 and 68 are put back into the airbag 10 via the inlet opening 13, the airbag 10 is completed.

To assemble the airbag device M1, the retainer 85 is housed inside the airbag 10 such that the bolts of the retainer 85 project out of the mounting holes 14, and then the airbag 10 is folded up. The airbag 10 is then wrapped up by a predetermined material for keeping the folded-up configuration. Then the airbag 10 is set on the bottom wall 89a of the case 89 such that the bolts of the retainer 85 protrude out of the through holes 89c. Subsequently, the body 87a of the inflator 87 is set in the insert hole 89b of the bottom wall 89a from the lower side such that the bolts of the retainer 85 go through the flange 87c. If the bolts of the retainer 85 are then fastened with unillustrated nuts, the airbag 10 and the inflator 87 are set in and secured to the case or housing 89, with the aid of the retainer 85. Thereafter, the airbag cover 93 is placed over the case 89 and the side wall 89d of the case 89 and the side wall 95 of the airbag cover 93 are joined together with the aid of rivets 61 or the like, thus the airbag cover 93 is mounted on the case 89. If then an unillustrated horn switch mechanism is attached to the mounting pieces 89e of the case 89, the airbag device M1 is completed. Then unillustrated mounting bases of the horn switch mechanism are used to mount the airbag device M1 on the steering wheel body 1, which has been mounted on the steering shaft SS. Thus the airbag device M1 is mounted on a vehicle.

When the airbag device M1 is actuated and an inflation gas G is fed to the airbag 10 via the inlet opening 13, the airbag 10 will inflate and push and open the doors 94a of the airbag cover 93. Then the airbag 10 will protrude out of the case 89 and be deployed over the top plane PR of the rim R, as indicated with double-dotted lines in FIG. 2.

When the driver-side wall 16 cushions the driver D at airbag deployment and moves toward the vehicle-side wall 12, which is supported by the top plane PR of the rim R of the steering wheel body 1, the connecting bands 36L and 36R of the exhaust strap 32 will loosen, which will allow the distant edge 33b region of the cover section 33, which has been subjected to an internal pressure of the airbag 10 through the inner opening 23 of the inner face region 22, to pass through the outer opening 21 and be deployed out of the outer face region 22, as shown in FIG. 9. This will provide gas communication between the outer opening 21 on the outer face region 20 and inner opening 23 on the inner face region 22, thus opening the vent hole 19. Accordingly, the airbag 10 will be able to release an extra inflation gas G and cushion the driver D with an adequate internal pressure.

The steering wheel W is mounted on the steering shaft SS which is mounted on the vehicle V at a predetermined column angle θc. The joint regions 37L and 37R of the connecting bands 36L and 36R of the exhaust strap 32 to the driver-side wall 16 are located at positions closer to the center 17 region of the driver-side wall 16 compared with the position of the vent hole 19, and in a symmetrical fashion with respect to a center 17 region of the driver-side wall 16, as viewed from the side of the driver-side wall 16 at full deployment of the airbag 10 (FIGS. 4, 7 and 9). With this configuration, when the driver D moves towards the lower end Rb of the rim R of the steering wheel W in the event of an impact and bumps the airbag 10 as deployed and pushes the airbag 10 forward, the amount FL of forward movement of the vicinity of the center 17 of the driver-side wall 16 (FIGS. 14A and 14B) will be generally uniform whether the steering wheel W is steered straight ahead as shown in FIG. 14A or it is 180° turned as shown in FIG. 14B, since the rotation center Sc of the steering wheel W is generally coincident with the center 17 of the driver-side wall 16. That is, regardless of the steering angle of the steering wheel W, a loosening amount of the connecting bands 36L and 36R at cushioning the driver D will be generally steady and the vent hole 19 will open in a steady fashion, thus steadying the air venting property of the vent hole 19.

Moreover, referring to FIG. 9, when the airbag 10 as deployed is viewed from the side, an opening plane of the outer opening 21 and inner opening 23 is such that an outer edge 19b located away from the inlet opening 13 rises from an inner edge 19a located close to the inlet opening 13, and is closer to the vicinity of the center 17 of the driver-side wall 16. If, especially, the tethers 301 and 302 are further elongated to allow an increased clearance between the vehicle-side wall 12 and driver-side wall 16, the airbag 10 viewed from the side will be more spherical, and the outer edge 19b of the opening plane of the vent hole 19 will be located even closer to the vicinity of the center 17 of the driver-side wall 16.

However, since the length ES0 of the distant edge 40 of the exhaust strap 32 is shorter than the length EC0 of the proximate edge 39, even if the outer edge 19b of the opening plane of the vent hole 19 (especially, the outer edge 19b of the opening plane of the outer opening 21) is deployed close to the vicinity of the center 17 of the driver-side wall 16, the distant edge 40 of the cover section 33 of the exhaust strap 32 will be prevented from loosening and slipping out of the outer opening 21 at airbag deployment. That is, the distant edge 40 of the cover section 33 will be prevented from opening the vent hole 19 when the airbag simply completes deployment.

Figure 12:
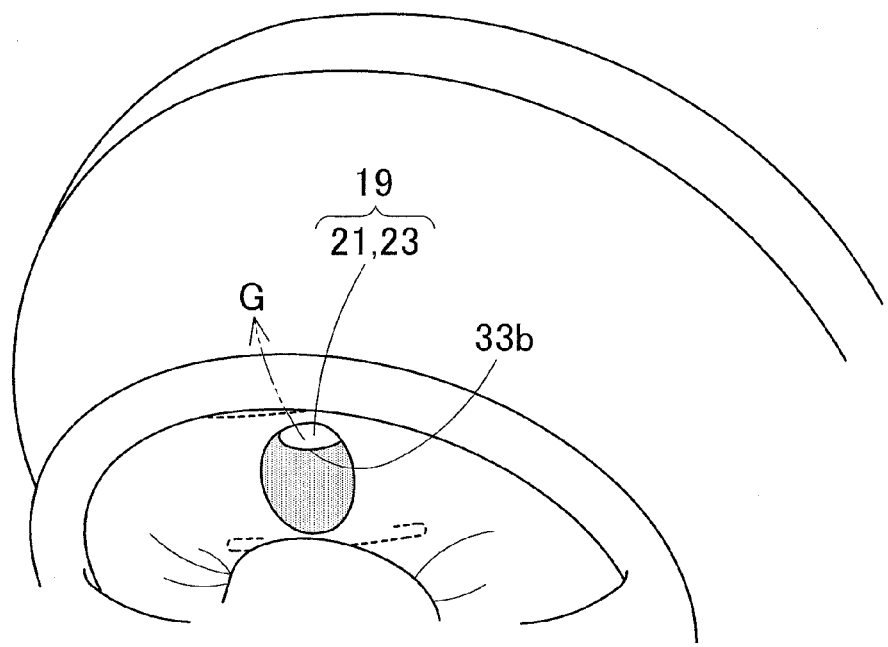
FIG. 12 is a perspective view showing a vicinity of a vent hole of a comparative example.

If the length ES0 of the distant edge 40 of the exhaust strap 32 is the same as the length EC0 of the proximate edge 39 in a situation where the airbag 10 is configured to inflate such that the outer edge 19b of the opening plane of the outer opening 21 be located close to the vicinity of the center 17 of the driver-side wall 16, the distant edge 40 of the tether will be allowed a room to slack by a distance that the outer edge 19b of the outer opening 21 is located closer to the center 17 of the driver-side wall 16, and the distant edge 33a region of the cover section 33 will be likely to slack and slip out of the outer opening 21 to open the vent hole 19 before the airbag 10 cushions the driver D as shown in FIG. 12.

Needless to say, the difference between the lengths EC0 and ES0 should be determined according to the thickness of the airbag 10 as inflated (in other words, the clearance between the vehicle-side wall 12 and the driver-side wall 16 to be limited by the tether 30, or the length of the exhaust strap 32 from the cover section 33 to the joint 37 to the center 17 of the driver-side wall 16) within such a range that the cover section 33 is capable of closing off the vent hole 19 at airbag deployment and is also openable when the airbag 10 cushions the driver D.

Therefore, the airbag device M1 for a driver's seat according to the first embodiment of the invention is stable in the air venting property of the vent hole 19. In other words, due to the configuration that the connecting bands 36L and 36R are joined to the vicinity of the center 17 of the driver-side wall 16, the airbag device M1 will be stable in an opening property of the vent hole 19 regardless of the angle the steering wheel W is turned. Further, due to the configuration that the length ES0 of the distant edge 40 of the exhaust strap 32 is shorter than the length EC0 of the proximate edge 39 by a predetermined difference of length, the airbag device M1 will have scarce fear of an unexpected opening of the vent hole 19 before the airbag 10 cushions the driver D.

In the first embodiment, the exhaust strap 32 is composed of two separate components that are joined together at an intermediate region of each of the connecting bands 36L and 36R; the vehicle-side component 42 and driver-side component 45. The vehicle-side component 42 includes the cover section 33 and a pair of vehicle-side connecting regions 43L and 43R extending from opposite sides of the cover section 33 and forming regions of the connecting bands 36L and 36R adjoining the cover section 33. The driver-side component 45 includes a pair of driver-side connecting regions 46L and 46R to be joined to the vehicle-side connecting regions 43L and 43R and the driver-side joint regions 37L and 37R that connect the driver-side connecting regions 46L and 46R to the driver-side wall 16.

With this configuration, the exhaust strap 32 can be formed easily by joining each of the vehicle-side component 42 and driver-side component 45 to the vehicle-side wall 12/driver-side wall 16, joining the vehicle-side wall 12 and driver-side wall 16 together by the outer peripheral edges 12b and 16a, and joining each of the vehicle-side connecting regions 43L and 43R and each of the driver-side connecting regions 46L and 46R together.

Further, in the first embodiment, each of the vehicle-side connecting regions 43L and 43R of the vehicle-side component 42 is provided with the bent region 43c so as to form a difference in lengths of the inner and outer edges. This way the length ES0 of the distant edge 40 of the exhaust strap 42 is easily made shorter than the length EC0 of the proximate edge 39.

Figure 16:
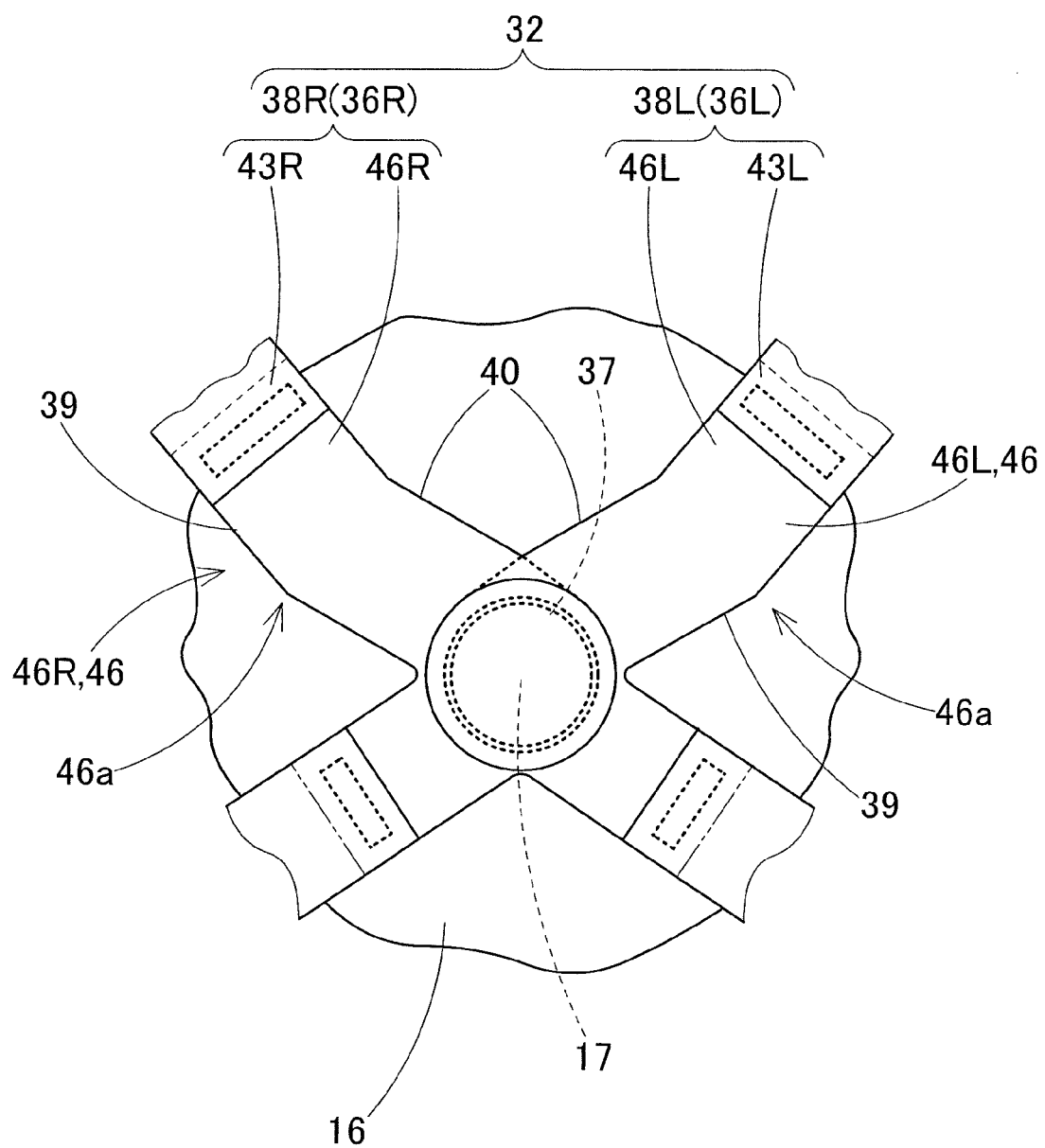
FIG. 16 depicts a modification of an exhaust strap of the first embodiment.

Alternatively, as shown in FIG. 16, each of the driver-side connecting regions 46L and 46R of the driver-side component 45 may be provided with a bent region 46a, instead of the vehicle-side connecting regions 43L and 43R, in order to form a difference in lengths of the inner and outer edges and make the length ES0 of the distant edge 40 of the exhaust strap 42 shorter than the length EC0 of the proximate edge 39.

Further alternatively, the difference in lengths may be provided on both of the vehicle-side connecting regions 43 (43L and 43R) and driver-side connecting regions 46 (46L and 46R), or may be provided on either one of the vehicle-side connecting regions 43L and 43R and one of the driver-side connecting regions 46L and 46R.

Figure 17:
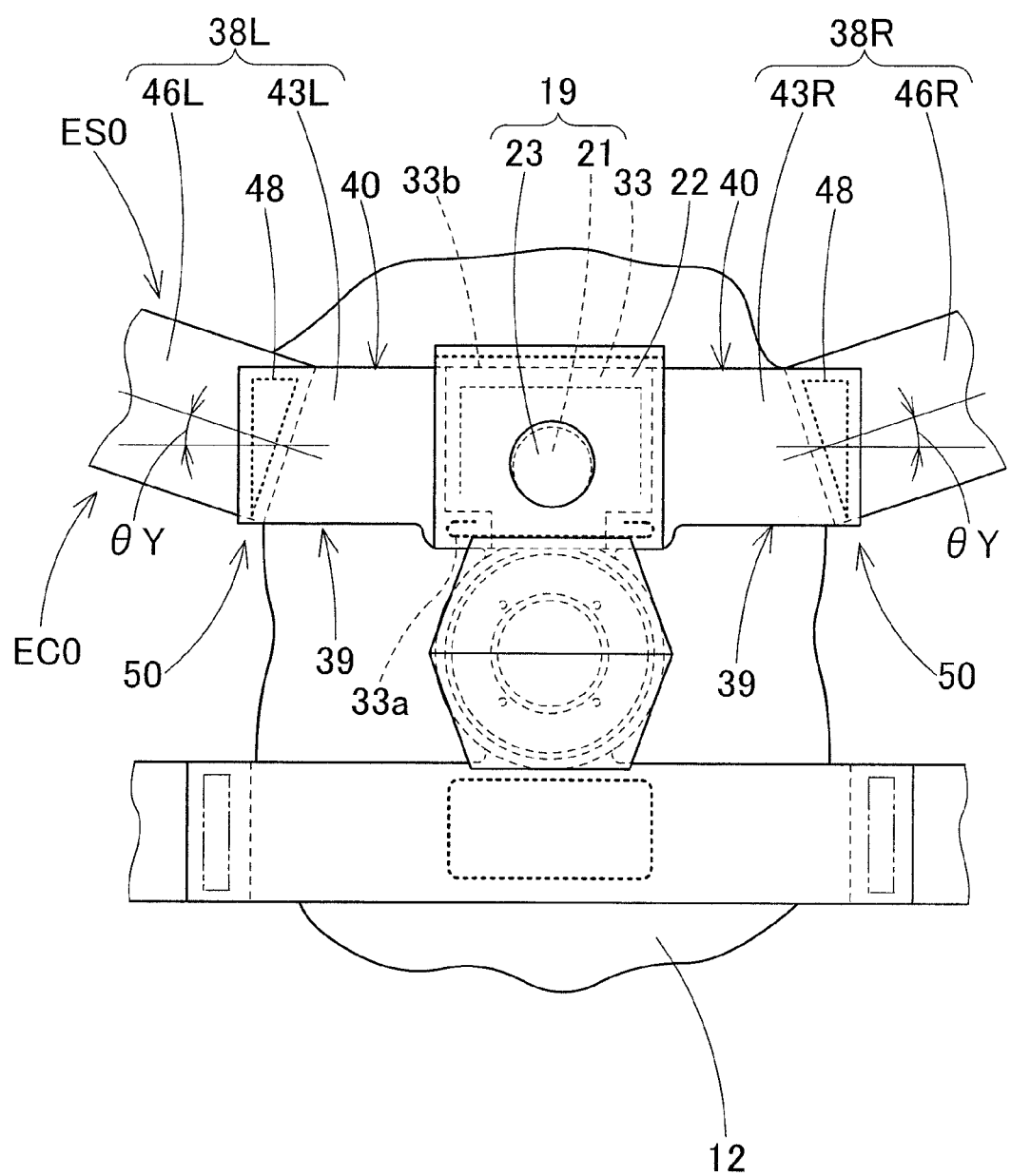
FIG. 17 depicts another modification of the exhaust strap of the first embodiment.
Figure 18:
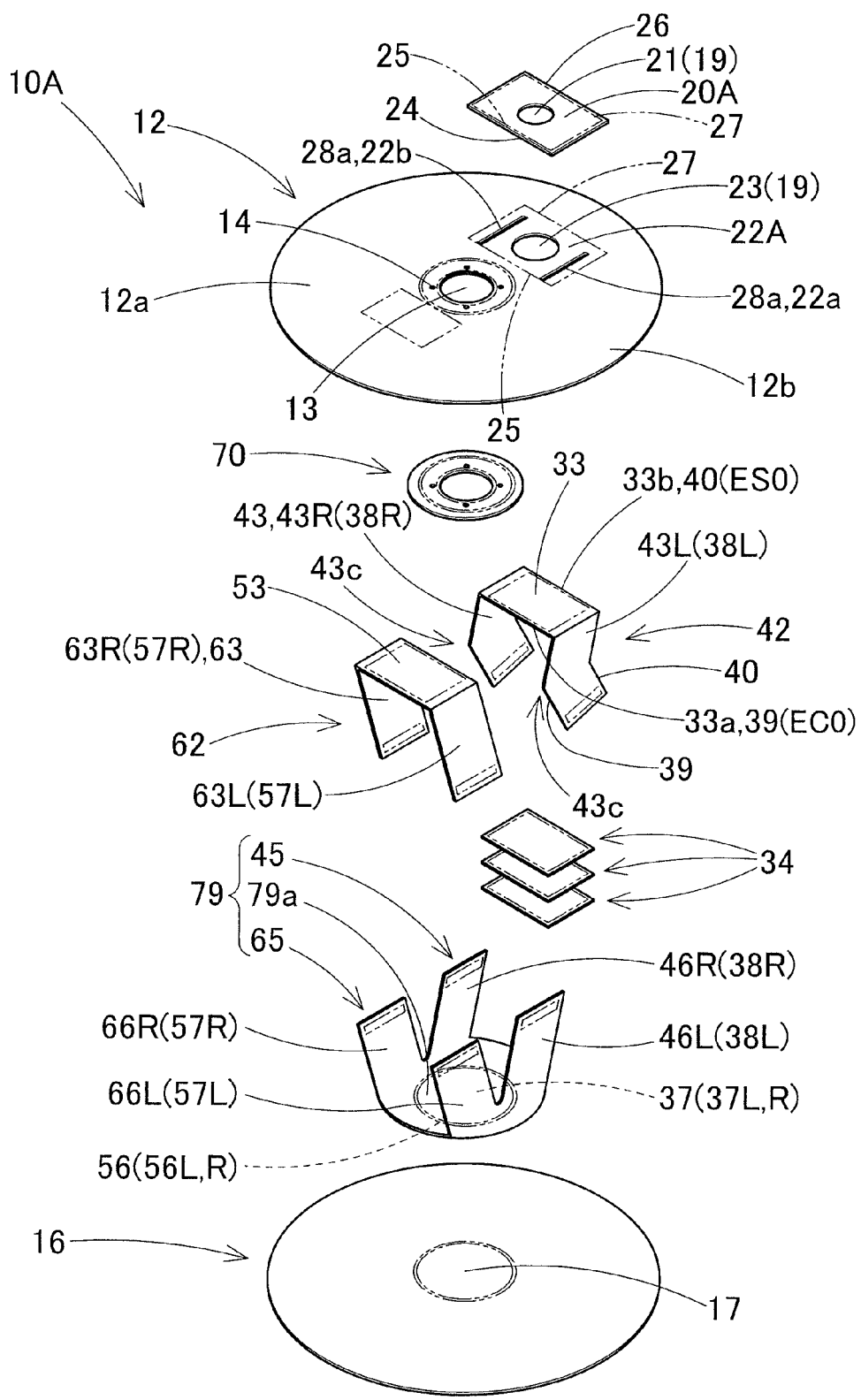
FIG. 18 depicts components of an airbag of the second embodiment by perspective views.
Figure 19:
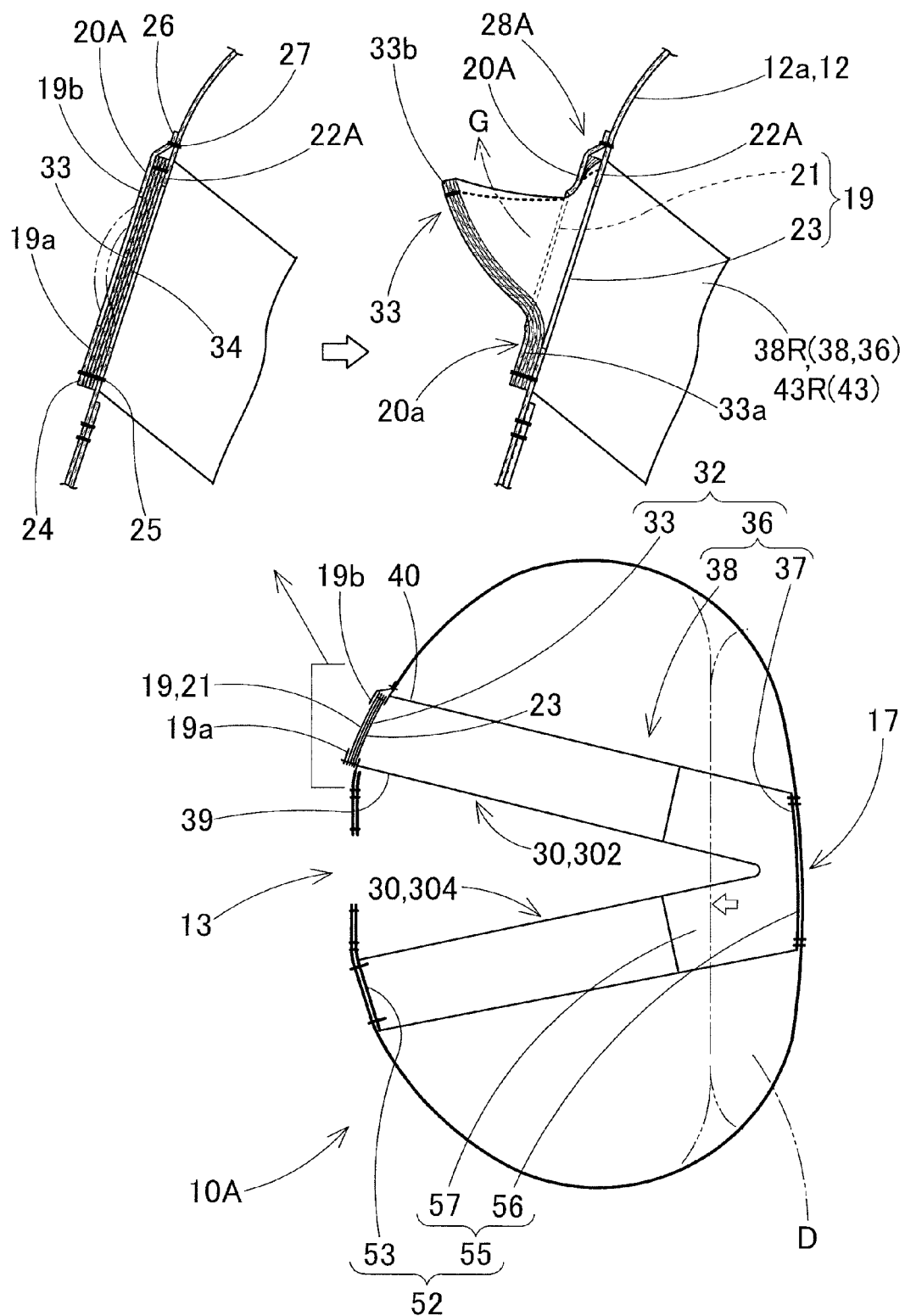
FIG. 19 is a schematic vertical section of the airbag of the second embodiment and also shows the way a vent hole is opened.
Figure 20A:
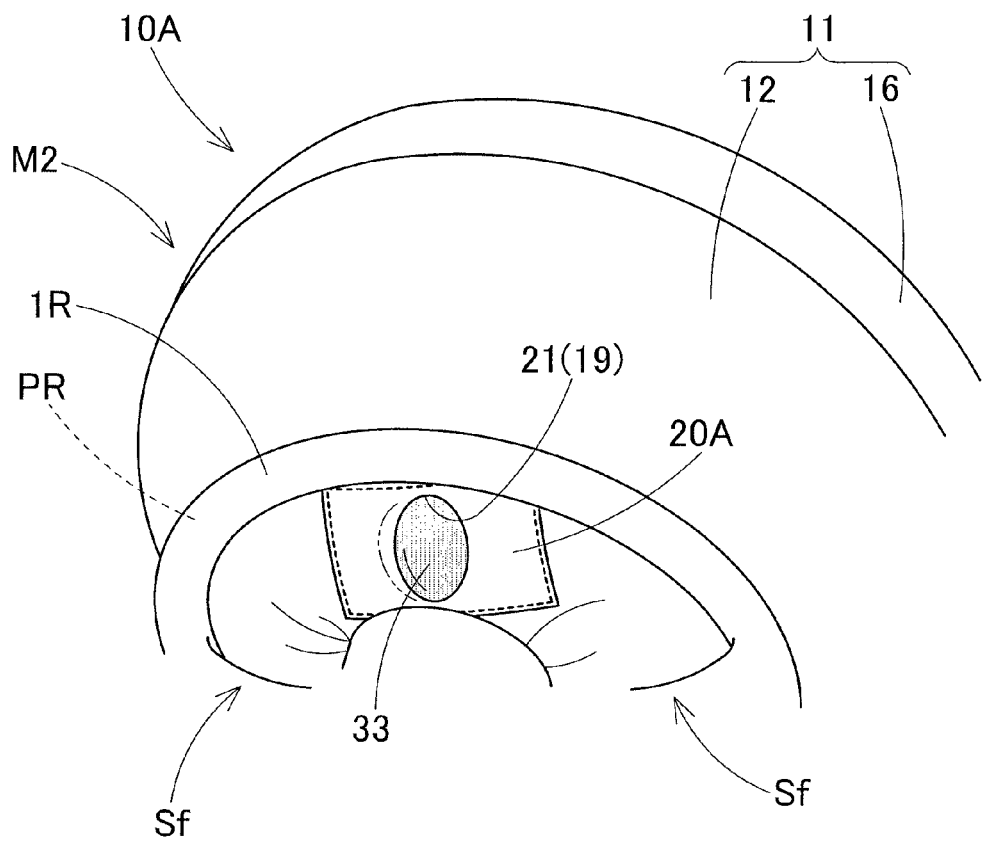
FIGS. 20A and 20B show the way the vent hole is opened in the airbag of the second embodiment by perspective views.
Figure 20B:
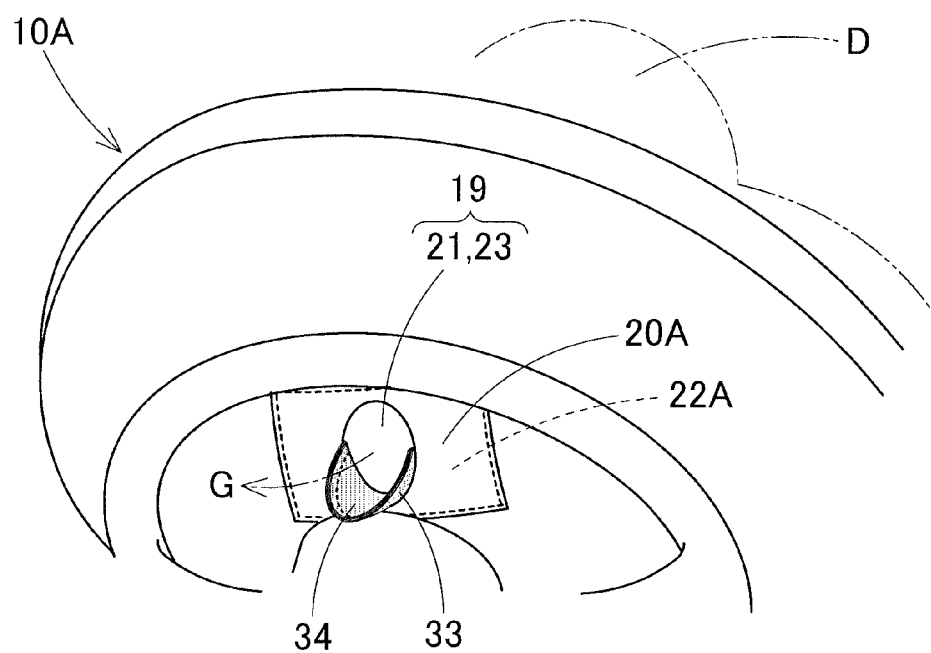

Further alternatively, the difference in lengths may be formed by adjusting an angle at which the vehicle-side connecting regions 43L and 43R of the vehicle-side component 42 and the driver-side connecting regions 46L and 46R of the driver-side component 45 are joined together, as shown in FIG. 17. In FIG. 17, each of the driver-side connecting regions 46L and 46R is sewn to each of the vehicle-side connecting regions 43L and 43R by the seam 48 in such a manner as to be bent outwardly (or forward) from the vehicle-side connecting region 43L/43R at an angle θY, thus forming bent regions 50 and making the length of the distant edge 40 of the exhaust strap 32 shorter than that of the proximate edge 39.

Further alternatively, the band bodies 38 (38L and 38R) formed by joining the connecting regions 43 (43L and 43R) and 46 (46L and 46R) may be each formed into an arcuate shape as a whole without a bent region 43c, 46a or 50 such that the distant edge 40 is shorter in length than the proximate edge 39.

In the first embodiment, the vehicle-side component 42 of the exhaust strap 32 and the vehicle-side component 62 of the regulating strap 52 are provided in an integrated fashion as the shared vehicle-side component 76 with the reinforcing region 76a. However, the vehicle-side component 42 of the exhaust strap 32 and the vehicle-side component 62 of the regulating strap 52 may also be provided separately.

In the illustrated embodiment, the exhaust strap 32 and regulating strap 52 are composed of two shared members (i.e., the shared vehicle-side component 76 and share driver-side component 79). This configuration will help reduce the number of parts of the airbag 10 and reduce the labor hour for producing the airbag 10.

Although the exhaust strap 32 of the first embodiment is composed of two separate components (the vehicle-side component 42 and driver-side component 45), it may be composed of more than two separate components, or only one component.

Likewise, the regulating strap 52 may also be composed of more than two components. By way of example, it would be conceivable to provide the vehicle-side component 62 of the regulating strap 52 separate from the vehicle-side component 42 of the exhaust strap 32, and to split the vehicle-side component 62 at the vehicle-side joint region 53 into a left edge 53a region and a right edge 53b region. Alternatively, the regulating strap 52 may be composed of only one component.

The tethers other than the tethers 301 and 302 (i.e., the exhaust strap 32) basically have only to regulate the clearance between the vehicle-side wall 12 and driver-side wall 16 in a balanced fashion in cooperation with the exhaust strap 32. Therefore, additional tethers may be provided other than the tethers 303 and 304, exclusively for regulating the clearance between the vehicle-side wall 12 and driver-side wall 16. Such tethers may be joined to different positions of the vehicle-side wall 12 and driver-side wall 16 from the illustrated embodiment on condition that they are able to regulate the clearance between the vehicle-side wall 12 and driver-side wall 16 in a balanced fashion in cooperation with the exhaust strap 32.

In the first embodiment, referring to FIG. 9, when the airbag 10 as deployed is viewed from the side, the cover section 33 of the exhaust strap 32 is located farther towards the outer peripheral edge 10a of the airbag 10 in comparison with the joint regions 37L and 37R of the connecting bands 36L and 36R joined to the center 17 region of the driver-side wall 16. With this configuration, the cover section 33 is likely to be pulled towards the inlet opening 13 due to the tension force of the connecting bands 36. Especially, the distant edge 33b of the cover section 33, which is not sewn to the vehicle-side wall 12 unlike the proximate edge 33a, is likely to slip toward the proximate edge 33a.

However, the cover section 33 is provided with the reinforcing cloths (reinforcing element) 34 that prevent the distant edge 33b from slipping towards the proximate edge 33a while allowing the distant edge 33b to flex to pass through the outer opening 21 to open the vent hole 19. Therefore, the distant edge 33a of the cover section 33 will be prevented from slipping toward the proximate edge 33a and unexpectedly opening the vent hole 19 while the airbag 10 is merely inflated.

Figure 13:
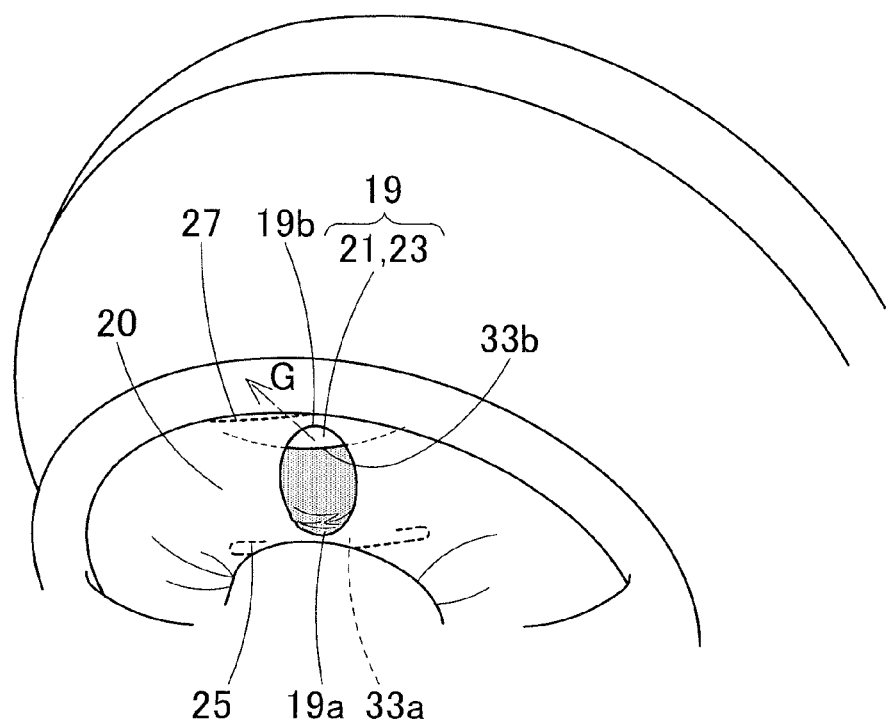
FIG. 13 is a perspective view showing a vicinity of a vent hole of another comparative example.

If the cover section 33 of the exhaust strap 32 is not provided with such a reinforcing cloth 34, when the airbag 10 is only inflated and deployed, the distant edge 33b of the cover section 33 will be affected by a tension force acting on the connecting bands 36L and 36R of the exhaust strap 32 and urged to slip towards the proximate edge 33a (i.e., toward the center of the vehicle-side wall 12) and may allow a communication between the inner opening 23 and outer opening 21 before the airbag 10 cushions the driver D, as shown in FIG. 13.

In the first embodiment, the reinforcing element is composed of the reinforcing cloths 34 joined to the cover section 33.

With this configuration, the reinforcing element can be easily formed by joining the reinforcing cloths 34 to the cover section 33 by sewing, adhesion or welding. Further, the number of reinforcing cloths 34 may be varied and easily adjusted depending on a degree of the tension force acting to move the distant edge 33b of the cover section 33 towards the proximate edge 33a.

In the first embodiment, the reinforcing cloths 34 are applied to and sewn to the cover section 33 by the outer peripheral edge such that the outer peripheral edges are disposed between the outer face region 20 and inner face region 22. The seam 35 sewing the reinforcing cloths 34 to the cover section 33 is formed into an inverse U shape with a pair of the straight regions 35b and 35c extending generally in parallel to the straight line CL connecting the inlet opening 13 and vent hole 19 at left and right edges 34b and 34c of the cover section 33 and the straight region 35a connecting the leading ends of the straight regions 35b and 35c at the outer edge 34a disposed at the distant edge 33b of the cover section 33 (FIGS. 3 and 8).

The sewing work of the reinforcing cloth 34 can be easily done as a part of the production process of the airbag 10 since the airbag 10 itself is formed by sewing work. Moreover, since the seam 35 sewing the reinforcing cloths 34 to the cover section 33 is disposed between the outer face region 20 and inner face region 22 on the cover section 33 and is unlikely to be caught by the left and right edges 22a and 22b of the inner face region 22, the seam 35 will not hinder a sliding movement of the cover section 33 between the outer face region 20 and inner face region 22, i.e., inside the guide section 28, when the airbag 10 cushions the driver D, such that the cover section 33 will smoothly slip out of the outer opening 21 and deployed on the outer surface 20a of the outer face region 20 and opening the vent hole 19, as shown in FIGS. 5, 8, 10. Further, since the seam 35 has a continuous configuration of the straight regions 35b and 35c disposed at the left and right edges 34b and 34c of the cover section 33 and the straight region 35a connecting the straight regions 35b and 35c, it will be able to prevent an inflation gas G from entering into a space between the cover section 33 and reinforcing cloths 34 from the part of the distant edge 33b. If an inflation gas G enters into the space between the cover section 33 and reinforcing cloths 34 from the part of the distant edge 33b, the region will bulge and may block the outer opening 21, i.e., block the vent hole 19. The proximate edge 33a of the cover section 33 is sewn to the outer face region 20 and inner face region 22, thus has a limited fear of entering of an inflation gas G between the cover section 33 and reinforcing cloths 34 from the part of the proximate edge 33a. Therefore, sewing of the reinforcing cloths 34 to the cover section 33 on the part of the proximate edge 33a is optional. In the first embodiment, the seam 25 sews the inner edges 34d of the reinforcing cloths 34 on the part of the proximate edge 33a to the vehicle-side wall 12 together with the cover section 33.

Figure 10B:
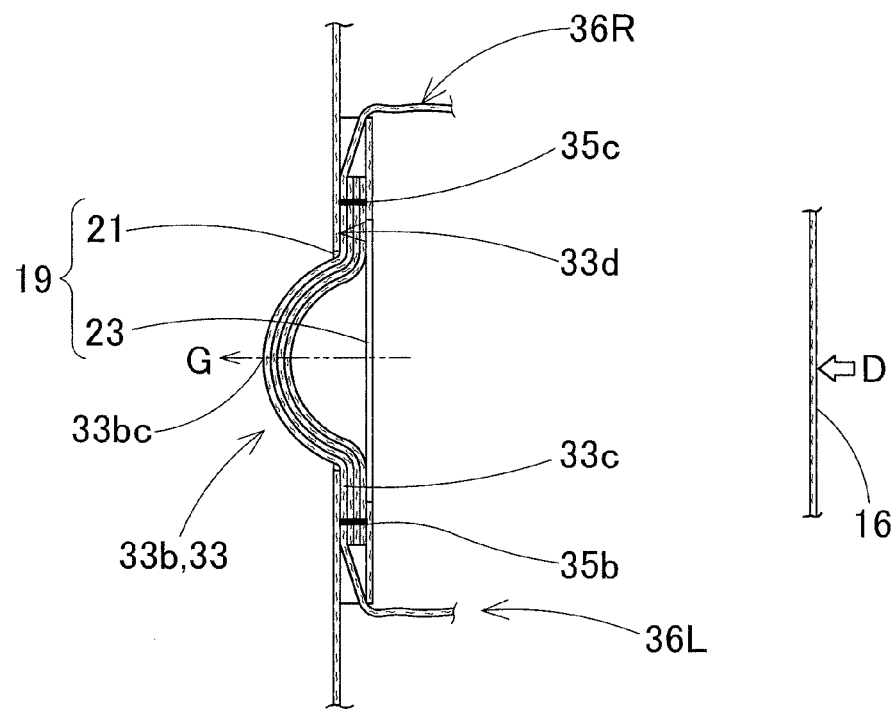
Figure 11A:
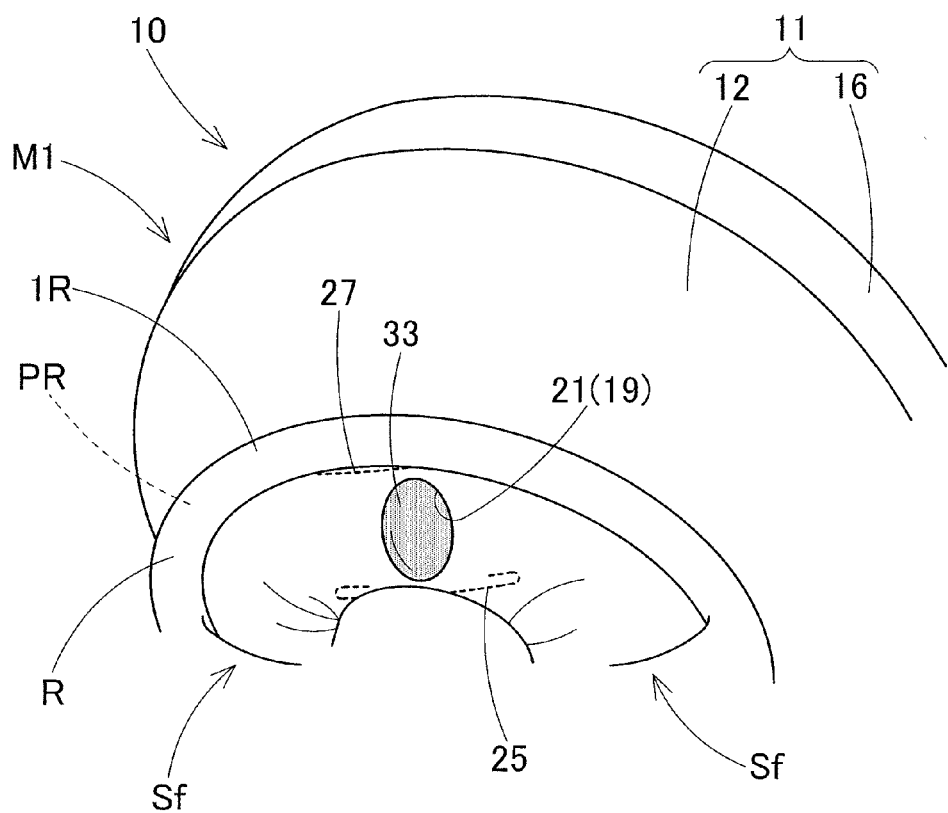
FIGS. 11A and 11B show the way the vent hole is opened in the airbag of the first embodiment by perspective views.
Figure 11B:
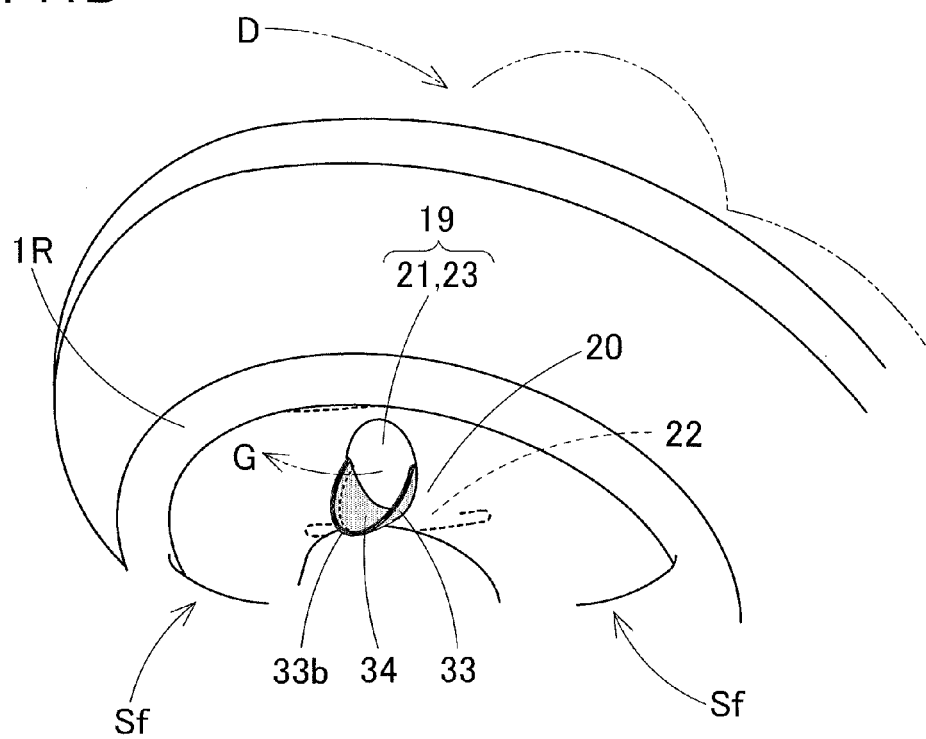

Further, the straight regions 35b and 35c of the seam 35 help secure a rigidity to act against a slipping movement of a central region 33bc of the distant edge 33b of the cover section 33 towards the proximate edge 33a to such a degree as not to hinder the behavior of the distant edge 33b of the cover section 33 to pass through the outer opening 21 and flex or bend in such a manner as to form an outwardly bulging curve at the central region 33bc of the distant edge 33b as shown in FIGS. 9 to 10B, when the airbag 10 cushion the driver D.

Although the first embodiment uses three reinforcing cloths 34, the number of the reinforcing cloth 34 should not be limited thereby. As long as the slipping movement of the distant edge 33b of the cover section 33 is prevented in an adequate fashion, the number of the reinforcing cloth 34 may be determined arbitrarily.

The reinforcing element of the cover section 33 may also be formed of any reinforcing material other than the reinforcing cloth on condition that the reinforcing element is capable of preventing the slipping movement of the distant edge 33b before the airbag 10 cushions the driver D and yet allowing the distant edge 33b to flex and pass through the outer opening 21 to open the vent hole 19 when the airbag 10 cushions the driver D. By way of example, it is conceivable to apply a reinforcing member in the form of a rod or a line to the left and right edges 33c and 33d of the cover section 33 along a front and rear direction. A wire, rod, or sheet material of synthetic resin or metal can serve as such reinforcing members. An adhesive may also be used as the reinforcing element by impregnating the left and right edges 33c and 33d of the cover section 33 with the adhesive and waiting for the adhesive to solidify. A mere sewing thread used to stitch the cover section 33, like the seam 35, can also serve as the reinforcing element.

In the first embodiment, the outer opening 21 of the vent hole 19 is formed on the outer face region 20 which constitutes the main body 12a of the vehicle-side wall 12. Alternatively, the vent hole 19 may also be configured like an airbag 10A according to the second embodiment shown in FIGS. 18 to 20B. In the airbag 10A, an outer opening 21 of the vent hole 19 is formed on an outer face region 20A which is joined to a main body 12a of the vehicle-side wall 12, and a part of the main body 12a constitutes an inner face region 22A. The vent hole 19 is composed of the outer opening 21 formed on the outer face region 20A and an inner opening 23 formed on the inner face region 22A. Further, at left and right edges 22a and 22b of the inner face region 22A (on the left and right sides of the inner opening 23) are each one slit 28a which the connecting bands 36 (36L and 36R) of the exhaust strap 32 are passed through such that the cover section 33 is disposed between the outer face region 20A and inner face region 22A.

More specifically, in the second embodiment, the outer face region 20A is sewn to the main body 12a (i.e., to the inner face region 22A) by the four sides (i.e., by the inner edge 24 which is disposed close to the inlet opening 13, the outer edge 26 which is distant from the inlet opening 13, and the left and right edges). The cover section 33 of the exhaust strap 32 is placed inside a guide section 28A which is composed of the outer face region 20A and inner face region 22A while the connecting bands 36L and 36R extending from the left and right sides of the cover section 33 are passed through the slits 28a to extend towards the center 17 region of the driver-side wall 16. Except this configuration, the airbag 10A has generally the same configuration as the first embodiment.

That is, the proximate edge 33a of the cover section 33 is sewn to the vehicle-side wall 12 together with the outer face region 20A with a seam 25. The exhaust strap 32 is provided with a bent region 43c such that the length ES0 of the distant edge 40 is shorter than the length EC0 of the proximate edge 39. The cover section 33 is provided with reinforcing cloths 34. Driver-side joint regions 37 of the exhaust strap 32 are joined to the center 17 region of the driver-side wall 16. The airbag 10A also includes a regulating strap 52. In the airbag 10A, three separate components of a vehicle-side component 42, a vehicle-side component 62 and a shared driver-side component 79 constitute the exhaust strap 32 and regulating strap 52.

In a similar fashion to the first embodiment, the airbag 10A is assembled with a predetermined retainer 85 (not shown) and mounted on a case 89 (not shown) in a folded-up configuration together with an inflator 87 (not shown). The case 89 is mounted on an airbag cover 93 (not shown) so as to form an airbag device M2, and the airbag device M2 is mounted on a steering wheel body 1 secured to a steering shaft SS. If the airbag device M2 is actuated after being mounted on a vehicle, it will operate in the same fashion to the first embodiment.

Although the inner opening 23 in the foregoing embodiments is formed of a round opening, it may also be composed of a plurality of small round openings or the like.

What is claimed is:

1. An airbag device for a driver's seat adapted to be mounted on a boss section of a steering wheel of a vehicle disposed at a generally center of a rim of the steering wheel, the airbag device comprising an airbag stored in the boss section in a folded-up configuration and inflatable with an inflation gas, wherein the airbag includes a vehicle-side wall deployable towards the rim of the steering wheel, a driver-side wall deployable towards the driver's seat and a plurality of tethers that connect the vehicle-side wall and driver-side wall for regulating a clearance between the vehicle-side wall and driver-side wall at airbag deployment;

wherein the vehicle-side wall includes:
an inlet opening disposed generally at the center of the vehicle-side wall for introducing an inflation gas;
a vent hole disposed in a vicinity of the inlet opening for releasing the inflation gas;
an outer face region that forms an outer shell of the vehicle-side wall at the location of the vent hole; and
an inner face region that is disposed on an inner side of the outer face region;

wherein the vent hole includes an outer opening formed on the outer face region and an inner opening formed on the inner face region in such a manner as to overlap with the outer opening;

wherein a pair of tethers out of said tethers serves as an exhaust strap including:
a cover section that is held between the outer face region and inner face region in such a manner as to be joined to the vehicle-side wall and closes off the outer opening at airbag deployment in an openable fashion; and
a pair of connecting bands extending from opposite sides of the cover section and joined to the driver-side wall, the connecting bands extending from the cover section in a symmetrical fashion with respect to a straight line connecting the inlet opening and vent hole as viewed from a part of the driver-side wall at full inflation of the airbag;

wherein the cover section includes a proximate edge disposed on a part close to the inlet opening and a distant edge disposed on a part distant from the inlet opening, and the cover section is joined to the vehicle-side wall by the proximate edge;

wherein the outer face region and inner face region of the vehicle-side wall are joined together by inner edges thereof disposed on a part close to the inlet opening and outer edges thereof disposed on a part away from the inlet opening so as to hold the cover section of the exhaust strap between the outer face region and inner face region;

wherein the exhaust strap closes off the vent hole at airbag deployment with the cover section and is so configured, when the driver-side wall cushions a driver at airbag deployment and moves toward the vehicle-side wall, that the connecting bands loosen and allow a region of the cover section towards the distant edge to loosen and pass through the outer opening such that the outer opening and inner opening communicate to open the vent hole;

wherein the connecting bands of the exhaust strap are joined to the driver-side wall at a position closer to a center of the driver-side wall compared with a position of the vent hole and in a symmetrical fashion about a center region of the driver-side wall, as viewed from the part of the driver-side wall at full deployment of the airbag; and wherein the exhaust strap includes a proximate edge disposed on a part close to the inlet opening and a distant edge disposed on a part distant from the inlet opening, and a length of the distant edge of the exhaust strap is shorter than a length of the proximate edge of the exhaust strap.

2. The airbag device for a driver's seat according to claim 1, wherein:

the exhaust strap is composed of two separate components that are joined together at an intermediate region of each of the connecting bands; a vehicle-side component and a driver-side component;

the vehicle-side component includes the cover section and a pair of vehicle-side connecting regions extending from the opposite sides of the cover section and forming regions of the connecting bands adjoining the cover section, while the driver-side component includes a pair of driver-side connecting regions to be joined to the vehicle-side connecting regions and a joint region that connects the driver-side connecting regions to the driver-side wall; and either one of or both of the vehicle-side connecting regions of the vehicle-side component and the driver-side connecting regions of the driver-side component are adjusted in lengths of edges thereof on a part close to the inlet opening and on a part away from the inlet opening in order to make the length of the distant edge of the exhaust strap shorter than that of the proximate edge of the exhaust strap.

3. The airbag device for a driver's seat according to claim 1, wherein:

the exhaust strap is composed of two separate components that are joined together at an intermediate region of each of the connecting bands; a vehicle-side component and a driver-side component;

the vehicle-side component includes the cover section and a pair of vehicle-side connecting regions extending from the opposite sides of the cover section and forming regions of the connecting bands adjoining the cover section, while the driver-side component includes a pair of driver-side connecting regions to be joined to the vehicle-side connecting regions and a joint region that connects the driver-side connecting regions to the driver-side wall;

the vehicle-side connecting regions of the vehicle-side component and the driver-side connecting regions of the driver-side component are joined together at such a jointing angle as to make the length of the distant edge of the exhaust strap shorter than that of the proximate edge of the exhaust strap.

4. The airbag device for a driver's seat according to claim 1, wherein:

another pair of tethers out of said tethers serves as a regulating strap only for regulating the clearance between the vehicle-side wall and driver-side wall;

the regulating strap includes a vehicle-side joint region that is joined to the vehicle-side wall at a position point-symmetrical with the inner face region with respect to the inlet opening and a pair of connecting bands extending from opposite edges of the vehicle-side joint region and joined to the driver-side wall;

the connecting bands of the regulating strap are joined to the driver-side wall at a position closer to the center of the driver-side wall compared with the position of the vehicle-side joint region and in a symmetrical fashion with respect to the center region of the driver-side wall, as viewed from the part of the driver-side wall at full deployment of the airbag; and the connecting bands of the regulating strap and connecting bands of the exhaust strap are joined to the driver-side wall evenly radially with respect to the center of the driver-side wall.

5. The airbag device for a driver's seat according to claim 4, wherein:

the exhaust strap is composed of two separate components that are joined together at an intermediate region of each of the connecting bands; a vehicle-side component and a driver-side component;

the vehicle-side component includes the cover section and a pair of vehicle-side connecting regions extending from the opposite sides of the cover section and forming regions of the connecting bands adjoining the cover section, while the driver-side component includes a pair of driver-side connecting regions to be joined to the vehicle-side connecting regions and a joint region that connects the driver-side connecting regions to the driver-side wall;

the regulating strap is composed of two separate components that are joined together at an intermediate region of each of the connecting bands of the regulating strap; a vehicle-side component and a driver-side component;

the vehicle-side component of the regulating strap includes the vehicle-side joint region and a pair of vehicle-side connecting regions extending from opposite sides of the vehicle-side joint region and forming regions of the connecting bands of the regulating strap adjoining the vehicle-side joint region, while the driver-side component of the regulating strap includes a pair of driver-side connecting regions to be joined to the vehicle-side connecting regions of the vehicle-side component of the regulating strap and a joint region that connects the driver-side connecting regions of the regulating strap to the driver-side wall;

the vehicle-side component of the exhaust strap and the vehicle-side component of the regulating strap are provided in an integrated fashion as a shared vehicle-side component having a sheet shape, in which a reinforcing region to be sewn to a periphery of the inlet opening is disposed between the vehicle-side components of the exhaust strap and regulating strap; and the driver-side component of the exhaust strap and the driver-side component of the regulating strap are provided in an integrated fashion as a shared driver-side component having a sheet shape.

* * * * *